(12) United States Patent
Arai et al.

(10) Patent No.: US 6,830,633 B2
(45) Date of Patent: *Dec. 14, 2004

(54) MAGNETIC MATERIAL MANUFACTURING METHOD, RIBBON-SHAPED MAGNETIC MATERIALS, POWDERED MAGNETIC MATERIALS AND BONDED MAGNETS

(75) Inventors: Akira Arai, Shinosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,592

(22) Filed: May 30, 2001

(65) Prior Publication Data

US 2002/0053372 A1 May 9, 2002

(30) Foreign Application Priority Data

May 30, 2000 (JP) .......................................... 2000-159772
Dec. 28, 2000 (JP) .......................................... 2000-399881

(51) Int. Cl.[7] .............................................. H01F 1/053
(52) U.S. Cl. ....................... 148/101; 164/423; 164/463; 75/331; 75/334
(58) Field of Search ........................ 148/101; 164/423, 164/453, 463; 75/331, 334

(56) References Cited

U.S. PATENT DOCUMENTS

| | | | |
|---|---|---|---|
| 4,705,095 A | 11/1987 | Gaspar | |
| 4,851,058 A | 7/1989 | Croat | |
| 4,930,565 A | 6/1990 | Hackman et al. | |
| RE33,327 E | 9/1990 | Hackman et al. | |
| 5,665,177 A | 9/1997 | Fukuno et al. | |

FOREIGN PATENT DOCUMENTS

| | | |
|---|---|---|
| EP | 0 936 633 | 7/1998 |
| JP | 64-042501 | 2/1989 |
| JP | 02-165849 | 6/1990 |
| JP | 4-55042 | 2/1992 |
| JP | 05-062813 | 3/1993 |
| JP | 5-269549 | 10/1993 |
| JP | 05-269549 | 10/1993 |
| JP | 08-176648 | 7/1996 |
| JP | 08-215801 | 8/1996 |
| JP | 8-215801 | 8/1996 |
| JP | 09-271909 | * 10/1997 |
| JP | 10-265915 | 10/1998 |
| JP | 10-317110 | 12/1998 |
| JP | 11-045805 | 2/1999 |
| JP | 11-277188 | 10/1999 |
| JP | 11-315357 | 11/1999 |
| JP | 2000-077219 | 3/2000 |

OTHER PUBLICATIONS

Patent Application entitled, "Cooling Roll, Ribbon–Shaped Magnetic Materials, Magnetic Powders and Bonded Magnets".

* cited by examiner

*Primary Examiner*—John P. Sheehan
(74) *Attorney, Agent, or Firm*—Harness, Dickey & Pierce, P.L.C.

(57) ABSTRACT

A magnetic material manufacturing method, a ribbon-shaped magnetic material manufactured by the method, a powdered magnetic material formed from the ribbon-shaped magnetic material and a bonded magnet manufactured using the powdered magnet material are disclosed. The method and the magnetic materials can provide magnets having excellent magnetic properties and reliability. A melt spinning apparatus 1 is provided with a tube 2 having a nozzle 3 at the bottom thereof, a coil 4 for heating the tube and a cooling roll 5 having a circumferential surface 53 on which dimple correcting means is provided. A melt spun ribbon 8 is formed by injecting the molten alloy 6 from the nozzle 3 so as to be collided with the circumferential surface 53 of the cooling roll 5 in an inert gas atmosphere (ambient gas) such as helium gas, so that the molten alloy 6 is cooled and then solidified. In this process, dimples to be produced on a roll contact surface of the melt spun ribbon are divided by the dimple correcting means, thereby preventing formation of huge dimples.

22 Claims, 19 Drawing Sheets

MAGNETIC MATERIAL MANUFACTURING METHOD, RIBBON-SHAPED MAGNETIC MATERIALS, POWDERED MAGNETIC MATERIALS AND BONDED MAGNETS

BACKGROUND OF THE INVENTION

1. Field of the Invention

The present invention relates to a magnetic material manufacturing method, ribbon-shaped magnetic materials, powdered magnetic materials and bonded magnets. More specifically, the present invention relates to a magnetic material manufacturing method, a ribbon-shaped magnetic material manufactured by the method, a powdered magnetic material formed from the ribbon-shaped magnetic material and a bonded magnet manufactured using the powdered magnetic material.

2. Description of the Prior Art

Rare-earth magnetic materials formed from alloys containing rare-earth elements have high magnetic properties. Therefore, when they are used for magnetic materials for motors, for example, the motors can exhibit high performance.

Such magnetic materials are manufactured by the quenching method using a melt spinning apparatus, for example. Hereinbelow, explanation will be made with regard to the manufacturing method using the melt spinning apparatus.

FIG. 19 is a sectional side view which shows the situation caused at or around a colliding section of a molten alloy with a cooling roll in the conventional melt spinning apparatus which manufactures a ribbon-shaped magnetic material by means of a single roll method.

As shown in this figure, in the conventional method, a magnetic material made of a predetermined alloy composition (hereinafter, referred to as "alloy") is melt and such a molten alloy 60 is injected from a nozzle (not shown in the drawing) so as to be collided with a circumferential surface 530 of a cooling roll 500 which is rotating relative to the nozzle in the direction indicated by the arrow A in FIG. 19. The alloy which is collided with the circumferential surface 530 is quenched (cooled) and then solidified, thereby producing a ribbon-shaped alloy in a continuous manner. This ribbon-shaped alloy is called as a melt spun ribbon. Since the melt spun ribbon was quenched in a rapid cooling rate, its microstructure has a structure composed of an amorphous phase or a microcrystalline phase, so that it can exhibit excellent magnetic properties as it is or by subjecting it to a heat treatment. In this regard, it is to be noted that the dotted line in FIG. 19 indicates a solidification interface 710 of the molten alloy 60.

The rare-earth elements are liable to oxidize. When they are oxidized, the magnetic properties thereof tend to be lowered. Therefore, normally, the manufacturing of the melt spun ribbon 80 is carried out under an inert gas atmosphere.

However, this causes the case that gas enters between the circumferential surface 530 and the puddle 70 of the molten alloy 60, which results in formation of dimples (depressions) 9 in the roll contact surface 810 of the melt spun ribbon 80 (that is, the surface of the melt spun ribbon which is in contact with the circumferential surface 530 of the cooling roll 500). This tendency becomes prominent as the peripheral velocity of the cooling roll 500 becomes large, and in such a case the area of the formed dimples becomes also larger.

In the case where such dimples 9 (especially, huge dimples) are formed, the molten alloy 60 can not sufficiently contact with the circumferential surface 530 of the cooling roll 500 at the locations of the dimples due to the existence of the entered gas, so that the cooling rate is lowered to prevent rapid solidification. As a result, at portions of the melt spun ribbon where such dimples are formed, the crystal grain size of the alloy becomes coarse, which results in lowered magnetic properties.

Magnetic powder obtained by milling such a melt spun ribbon having the portions of the lowered magnetic properties has larger dispersion or variation in its magnetic properties. Therefore, bonded magnets formed from such magnetic powder can have only poor magnetic properties, and corrosion resistance thereof is also low.

SUMMARY OF THE INVENTION

In view of the above problem involved in the prior art, it is an object of the present invention to provide a magnetic materials manufacturing method which can manufacture magnets having excellent magnetic properties and reliability, as well as a ribbon-shaped magnetic material manufactured by the method, a powdered magnetic material formed from the magnetic material and a bonded magnet manufactured using the magnetic powder.

In order to achieve the above object, the present invention is directed to a magnetic material manufacturing method for manufacturing a ribbon-shaped magnetic material by colliding a molten alloy to a circumferential surface of the cooling roll so as to cool and then solidify it, the ribbon-shaped magnetic material having an alloy composition represented by the formula of $R_x(Fe_{1-y}Co_y)_{100-x-y}B_z$ (where R is at least one rare-earth element, x is 10–15 at %, y is 0–0.30 and z is 4–10 at %), wherein the circumferential surface of the cooling roll has dimple correcting means for dividing dimples to be produced on a roll contact surface of the ribbon-shaped magnetic material which is in contact with the circumferential surface of the cooling roll.

According to the above structure, it becomes possible to provide a magnetic material manufacturing method which can manufacture magnets having excellent magnetic properties and excellent reliability.

In this invention, it is preferred that the cooling roll includes a roll base and an outer surface layer provided on an outer peripheral portion of the roll base, and the outer surface layer has said dimple correcting means. This arrangement makes it possible to provide magnets having especially excellent magnetic properties.

In this case, it is preferred that the outer surface layer of the cooling roll is formed of a material having a heat conductivity lower than the heat conductivity of the structural material of the roll base at or around a room temperature. This makes it possible to quench the molten alloy of the magnetic material with an appropriate cooling rate, thereby enabling to provide magnets having especially excellent magnetic properties.

Further, the outer surface layer of the cooling roll is preferably formed of a ceramics. This also makes it possible to quench the molten alloy of the magnetic material with an appropriate cooling rate, thereby enabling to provide magnets having especially excellent magnetic properties. Further, the durability of the cooling roll is also improved.

Further, in the present invention, it is preferred that the outer surface layer of the cooling roll is formed of a material having a heat conductivity equal to or less than 80 W·m$^{-1}$·K$^{-1}$ at or around a room temperature. This also makes it possible to quench the molten alloy of the magnetic material with an appropriate cooling rate, so that it is possible to provide magnets having especially excellent magnetic properties.

Furthermore, it is also preferred that the outer surface layer of the cooling roll is formed of a material having a coefficient of thermal expansion in the range of 3.5–18[×$10^{-6}K^{-1}$] at or around a room temperature. According to this, the surface layer is firmly secured to the base roll of the cooling roll, so that peeling off of the surface layer can be effectively prevented.

In the present invention, it is also preferred that the average thickness of the outer surface layer of the cooling roll is 0.5 to 50 μm. This also makes it possible to quench the molten alloy of the magnetic material with an appropriate cooling rate, so that it is possible to provide magnets having especially excellent magnetic properties.

Moreover, it is also preferred that the outer surface layer of the cooling roll is manufactured without experience of machining process. By using such a cooling roll, the surface roughness Ra of the circumferential surface of the cooling roll can be made small without machining process such as grinding or polishing.

In the present invention, it is preferred that the dimple correcting means includes at least one ridge formed on the circumferential surface of the cooling roll. This makes it possible to divide dimples to be produced on the roll contact surface effectively, so that it is possible to provide magnets having especially excellent magnetic properties.

In this case, it is preferred that the average width of the ridge is 0.5–95 μm. This makes it possible to divide dimples to be produced on the roll contact surface more effectively, so that it is possible to provide magnets having especially excellent magnetic properties.

Further, it is also preferred that the ridge is provided by forming at least one groove in the circumferential surface of the cooling roll. By forming the ridge in this way, it becomes possible to adjust the width of the ridge and the like accurately.

Furthermore, it is also preferred that the average width of each groove is 0.5–90 μm. This also makes it possible to divide dimples to be produced on the roll contact surface more effectively, so that it is possible to provide magnets having especially excellent magnetic properties.

Furthermore, it is also preferred that the average height of the ridge or the average depth of the groove is 0.5–20 μm. This also makes it possible to divide dimples to be produced on the roll contact surface more effectively, so that it is possible to provide magnets having especially excellent magnetic properties.

Moreover, it is also preferred that the ridge or groove is formed spirally with respect to the rotation axis of the cooling roll. According to such a structure, it is possible to form the cooling roll with the grooves and ridges relatively easily. Further, this also makes it possible to divide dimples to be produced on the roll contact surface more effectively, so that it is possible to provide magnets having especially excellent magnetic properties.

Moreover, it is also preferred that the at least one ridge or groove includes a plurality of ridges or grooves which are arranged in parallel with each other through an average pitch of 0.5–100 μm. According to this arrangement of the ridges or grooves, it is possible to make dispersion or variation in the cooling rates at various portions of the molten alloy small, so that it is possible to provide magnets having especially excellent magnetic properties.

Further, in the present invention, it is also preferred that the ratio of the projected area of the ridge or groove with respect to the projected area of the circumferential surface is equal to or greater than 10%. This makes it possible to quench the molten alloy of the magnetic material with an appropriate cooling rate, so that it is possible to provide magnets having especially excellent magnetic properties.

Moreover, in the manufacturing method mentioned above, it is preferred that the method includes a step for milling the ribbon-shaped magnetic material. This makes it possible to provided powdered magnetic material having excellent magnetic properties and excellent reliability.

Another aspect of the present invention is directed to a ribbon-shaped magnetic material which is manufactured by colliding a molten alloy to a circumferential surface of a cooling roll so as to cool and then solidify it, the ribbon-shaped magnetic material having an alloy composition represented by the formula of $R_x(Fe_{1-y}Co_y)_{100-x-z}B_z$ (where R is at least one rare-earth element, x is 10–15 at %, y is 0–0.30 and z is 4–10 at %), wherein the circumferential surface of the cooling roll has dimple correcting means for dividing dimples to be produced on a roll contact surface of the ribbon-shaped magnetic material which is in contact with the circumferential surface of the cooling roll.

According to the above structure, it is possible to provide a ribbon-shaped magnetic material which can provide magnets having especially excellent magnetic properties and having excellent reliability.

In this ribbon-shaped magnetic material, it is preferred that a roll contact surface of the ribbon-shaped magnetic material is formed with grooves or ridges so that dimples formed on the roll contact surface thereof are divided by the grooves or ridges. This also makes it possible to provide magnets having especially excellent magnetic properties.

Further, in this ribbon-shaped magnetic material, it is also preferred that the dimples produced on the roll contact surface of the ribbon-shaped magnetic material upon solidification thereof include huge dimples each having an area equal to or greater than 2000 μm², in which the ratio of the area in the roll contact surface occupied by thus produced huge dimples with respect to the total area of the roll contact surface of the ribbon-shaped magnetic material is equal to or less than 10%. Such ribbon-shaped magnetic material has less dispersion in crystal grain sizes at various portions thereof, so that it is possible to provide magnets having especially excellent magnetic properties.

Furthermore, in the ribbon shaped magnetic material, it is also preferred that the division of the dimples to be produced Is carried out by transferring the shape of at least a part of the circumferential surface of the cooling roll to the roll contact surface of the ribbon-shaped magnetic material. This also makes it possible to make the dispersion in the crystal grain sizes at the various portions of the ribbon-shaped magnetic material small, so that it is possible to provide magnets having especially excellent magnetic properties.

In this case, it is preferred that the average thickness of the ribbon-shaped magnetic material is 8–50 μm. By using such a ribbon-shaped magnetic material, it is possible to provide magnets having more excellent magnetic properties.

Other aspect of the present invention is directed to a powdered magnetic material which is obtained by milling a ribbon-shaped magnetic material which is manufactured by colliding a molten alloy to a circumferential surface of a cooling roll so as to cool and then solidify it, the ribbon-shaped magnetic material having an alloy composition represented by the formula of $R_x(Fe_{1-y}Co_y)_{100-x-z}B_z$ (where R is at least one rare-earth element, x is 10–15 at %, y is 0–0.30 and z is 4–10 at %), wherein the circumferential surface of the cooling roll has dimple correcting means for dividing dimples to be produced on a roll contact surface of the ribbon-shaped magnetic material which is in contact with the circumferential surface of the cooling roll.

By using such a powdered magnetic material, it is possible to provide magnets having excellent magnetic properties and reliability.

In this case, it is preferred that the powdered magnetic material is subjected to at least one heat treatment during or after the manufacturing process thereof. This makes it possible to provide magnets having more excellent magnetic properties.

Further, it is also preferred that the mean particle size of the powdered magnetic material lies within the range of 1–300 µm. This also makes it possible to provide magnets having more excellent magnetic properties.

Furthermore, in the powdered magnetic material, it is preferred that the powdered magnetic material is mainly composed of a $R_2TM_{14}B$ (here, TM is at least one transition metal) phase which is a hard magnetic phase. This makes it possible to provide magnets having especially excellent coercive force and heat resistance.

In this case, it is preferred that the volume ratio of the $R_2TM_{14}B$ phase with respect to the whole structure of the powdered magnetic material is equal to or greater than 80%. This also makes it possible to provide magnets having especially excellent coercive force and heat resistance.

Further, in this case, it is also preferred that the average crystal grain size of the $R_2TM_{14}B$ phase is equal to or less than 500 nm. This makes it possible to provide magnets having especially excellent coercive force and rectangularity.

The other aspect of the present invention is directed to a bonded magnet manufactured by binding a powdered magnetic material which is obtained by milling a ribbon-shaped magnetic material which is manufactured by colliding a molten alloy to a circumferential surface of a cooling roll so as to cool and then solidify it, the ribbon-shaped magnetic material having an alloy composition represented by the formula of $R_x(Fe_{1-y}Co_y)_{100-x-z}B_z$ (where R is at least one rare-earth element, x is 10–15 at %, y is 0–0.30 and z is 4–10 at %), wherein the circumferential surface of the cooling roll has dimple correcting means for dividing dimples to be produced on a roll contact surface of the ribbon-shaped magnetic material which is in contact with the circumferential surface of the cooling roll.

The bonded magnet manufactured as described above can have especially excellent magnetic properties and reliability.

In this case, it is preferred that the intrinsic coercive force $(H_{CJ})$ of the bonded magnet at a room temperature is in the range of 320–1200 kA/m. This makes it possible to provide a bonded magnet having excellent heat resistance and magnetizability as well as sufficient magnetic flux density.

In this case, it is preferred that the maximum magnetic energy product $(BH)_{max}$ of the bonded magnet is equal to or greater than 40 kJ/m³. By using such a bonded magnet, it is possible to provide high performance small size motors.

These and other objects, structures and advantages of the present invention will be apparent from the following detailed description of the invention and the examples taken in conjunction with the appended drawings.

DETAILED DESCRIPTION OF THE INVENTION

Hereinbelow, embodiments of the magnetic material manufacturing method of the present invention as well as embodiments of the ribbon-shaped magnetic material, powdered magnetic material and bonded magnet according to the present invention will be described in detail with reference to the accompanying drawings.

Structure of Melt Spinning Apparatus

Figure 1:
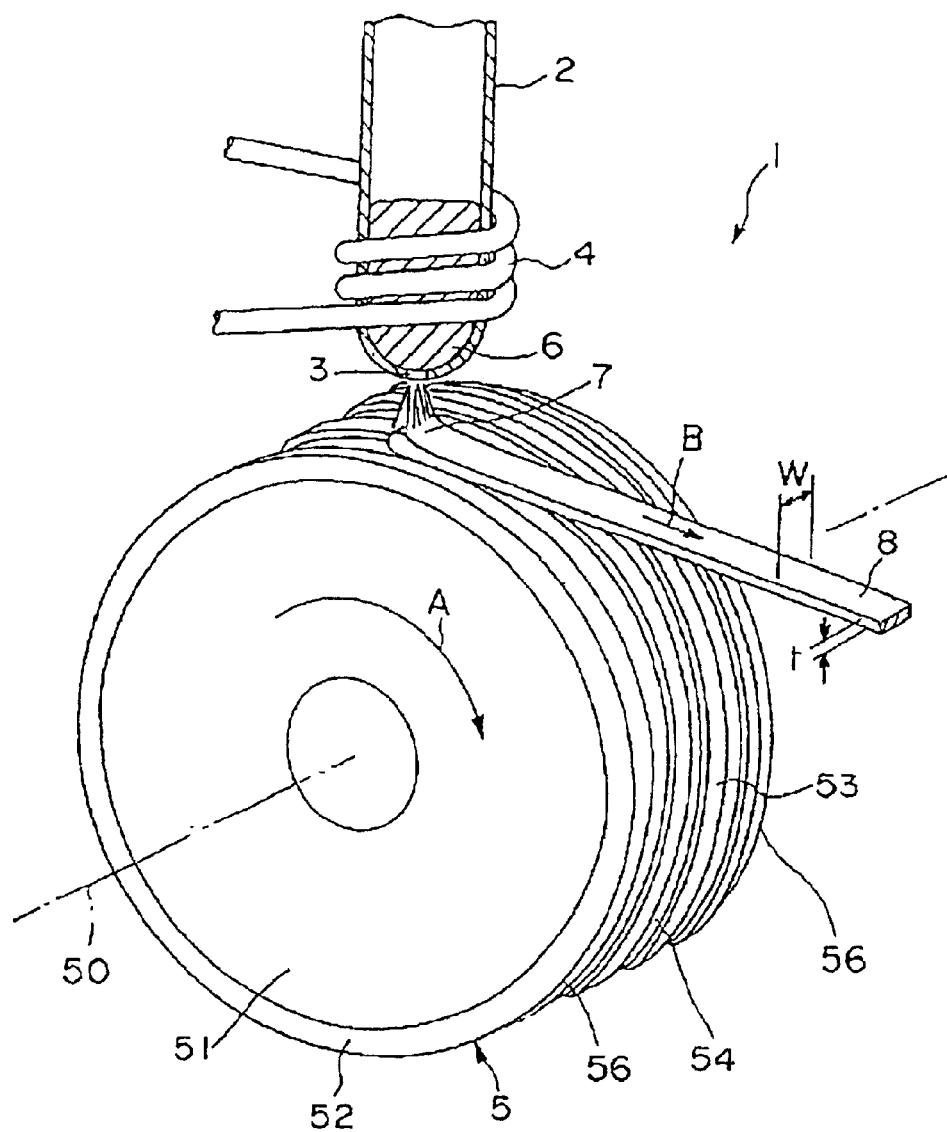
FIG. 1 is a perspective view which schematically shows an apparatus (melt spinning apparatus) for manufacturing a ribbon-shaped magnetic material equipped with a cooling roll which is used in a first embodiment of a magnetic material manufacturing method of the present invention.
Figure 2:
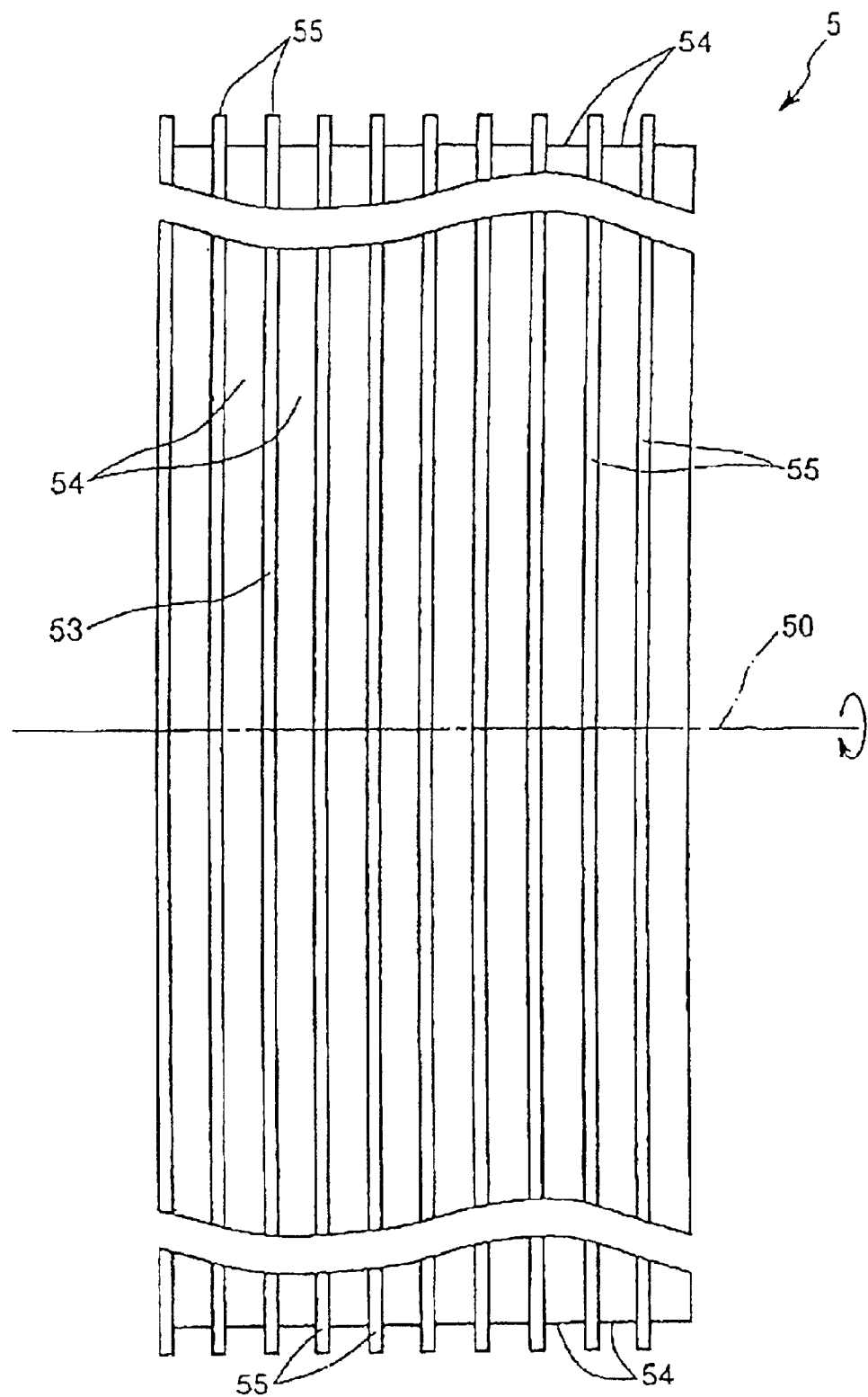
FIG. 2 is a front view of the cooling roll shown in FIG. 1.
Figure 3:
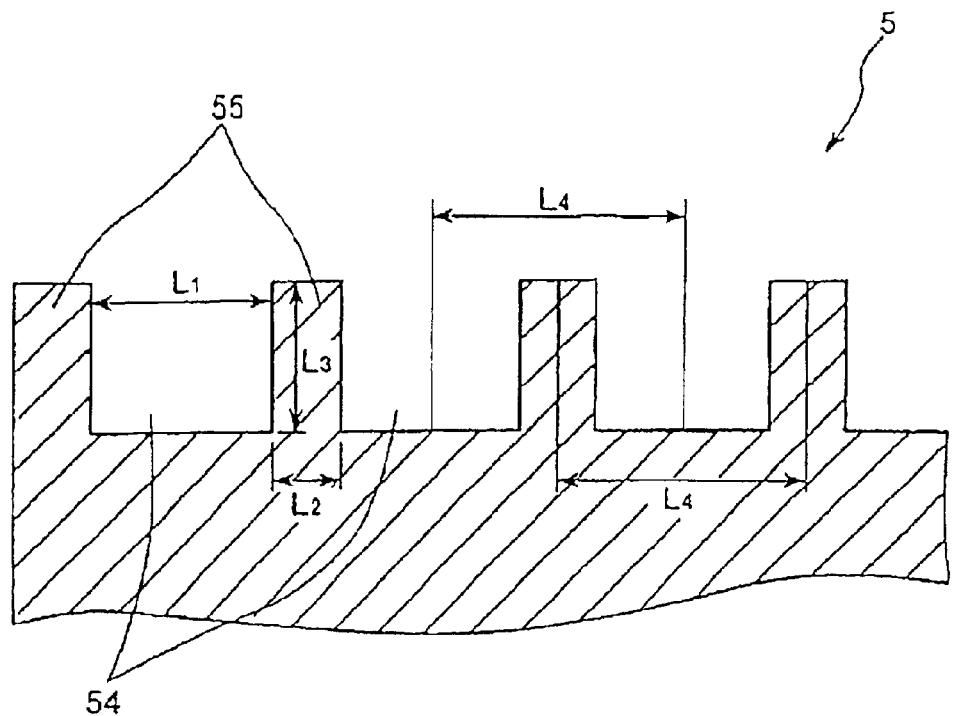
FIG. 3 is a sectional view which schematically shows the structure of a portion in the vicinity of the circumferential surface of the cooling roll shown in FIG. 1.

FIG. 1 is a perspective view showing a melt spinning apparatus which manufactures a ribbon-shaped magnetic material (melt spun ribbon) using a single roll method. The apparatus is provided with a cooling roll 5 used in a first embodiment of the magnetic material manufacturing method of the present invention. Further, FIG. 2 is a front view of the cooling roll shown in FIG. 1, and FIG. 3 is an enlarged sectional view of a part of a circumferential surface of the cooling roll shown in FIG. 1.

As shown in FIG. 1, the melt spinning apparatus 1 includes a cylindrical body 2 capable of receiving a magnetic material, and a cooling roll 5 which rotates in the direction of an arrow A in the figure relative to the cylindrical body 2. A nozzle (orifice) 3 which injects the molten magnetic material (molten alloy) 6 is formed at the lower end of the cylindrical body 2.

The cylindrical body 2 may be formed of a heat resistance ceramic material such as crystal, alumina, magnesia and the like.

The nozzle opening of the nozzle 3 may be formed into various shapes such as circle, ellipse, slit and the like.

In addition, on the outer periphery of the cylindrical body 2, there is provided a heating coil 4. By applying high frequency wave, for example, the inside of the cylindrical body 2 is heated (inductively heated) and therefore the magnetic material in the cylindrical body 2 becomes a melting state.

In this regard, it is to be noted that the heating means used in this apparatus is not limited to the coil 4 described above, and a carbon heater may be employed instead of the coil 4.

The cooling roll 5 is constructed from a roll base 51 and a surface layer 52 which constitutes the circumferential surface 53 of the cooling roll 5.

The surface layer 52 may be formed from the same material as that for the roll base 51. However, it is preferred that the surface layer 52 is formed from a material having a lower heat conductivity than that of the material for the roll base 51.

The material used for the roll base 51 Is not limited to a specific material. However, in the present invention, it is preferred that the roll base 51 is formed from a metal material having a high heat conductivity such as copper or copper alloys in order to make it possible to dissipate the heat generated in the surface layer 52 as quickly as possible.

The heat conductivity of the material of the surface layer 52 at or around a room temperature is not particularly limited to a specific value. However, it is preferable that the heat conductivity is equal to or less than 80 W·m$^{-1}$·K$^{-1}$, it is more preferable that the heat conductivity lies within the range of 3–60 W·m$^{-1}$·K$^{-1}$, and it is the most preferable that the heat conductivity lies within the range of 5–40 W·m$^{-1}$·K$^{-1}$.

By constructing the cooling roll 5 from the surface layer 52 and the roll base 51 each having the heat conductivity as described above, it becomes possible to quench the molten alloy 6 in an appropriate cooling rate. Further, the difference between the cooling rates at the vicinity of the roll contact surface 81 (which is a surface of the melt spun ribbon to be in contact with the circumferential surface of the cooling roll) and at the vicinity of the free surface 82 (which is a surface of the melt spun ribbon opposite to the roll contact surface) becomes small. Consequently, it is possible to obtain a melt spun ribbon 8 having less dispersion in its crystal grain sizes at various portions thereof and thereby having excellent magnetic properties.

Examples of the materials having such heat conductivity include metal materials such as Zr, Sb, Ti, Ta, Pd, Pt and alloys of such metals, metallic oxides of these metals, and ceramics. Examples of the ceramics include oxide ceramics such as $Al_2O_3$, $SiO_2$, $TiO_2$, $Ti_2O_3$, $ZrO_2$ $Y_2O_3$, barium titanate, and strontium titanate and the like; nitride ceramics such as AlN, $Si_3N_4$, TiN, BN, ZrN, HfN, VN, TaN, NbN, CrN, $Cr_2N$ and the like; carbide ceramics such as graphite, SiC, ZrC, $Al_4C_3$, $CaC_2$, WC, TiC, HfC, VC, TaC, NbC and the like; and mixture of two or more of these ceramics. Among these ceramics, nitride ceramics and materials containing it are particularly preferred.

As compared with the conventional materials used for constituting the circumferential surface of the cooling roll (that is, Cu, Cr or the like), these ceramics have high hardness and excellent durability (anti-abrasion characteristic). Therefore, even if the cooling roll 5 is repeatedly used, the shape of the circumferential surface 53 can be maintained, and therefore the effect of the dimple correcting means (described later) will be scarcely deteriorated.

Further, normally, the materials which can be used for the cooling roll 51 described above have high coefficient of thermal expansion. Therefore, it is preferred that the coefficient of thermal expansion of the material of the surface layer 52 is close to that of the material of the roll base 51. For example, the coefficient of thermal expansion (coefficient of linear expansion α) at or around a room temperature is preferably in the range of 3.5–18[×10$^{-6}$K$^{-1}$], and more preferably in the range of 6–12[×10$^{-6}$K$^{-1}$]. When the coefficient of thermal expansion of the material of the surface layer 52 at or around a room temperature lies within this range, It is possible to maintain reliable bonding between the roll base 51 and the surface layer 52, thereby enabling to prevent peeling-off of the surface layer 52 effectively.

The surface layer 52 may be formed into a laminate structure having a plurality of layers of different compositions, besides the single layer structure described above. For example, such a surface layer 52 may be formed from two or more layers which include a layer of the metallic material and a layer of the ceramic material described above. Example of such a two layer laminate structure of the surface layer 52 includes a laminate composed of a lower layer of the metallic material located at the side of the roll base 51 and an upper layer of the ceramic material. In this case, it is preferred that these adjacent layers are well adhered or bonded to each other. For this purpose, these adjacent layers may contain the same element therein.

Further, when the surface layer 52 is formed into such a laminate structure comprised of a plurality of layers, it is preferred that at least the outermost layer is formed from the material having the heat conductivity within the range described above.

Furthermore, in the case where the surface layer 52 is formed into the single layer structure described above, it is not necessary for the composition of the material of the surface layer to have uniform distribution in the thickness direction thereof. For example, the contents of the constituents may be gradually changed in the thickness direction thereof (that is, graded materials may be used).

The average thickness of the surface layer 52 (in the case of the laminate structure, the total thickness thereof) is not limited to a specific value. However, it is preferred that the average thickness lies within the range of 0.5–50 μm, and more preferably 1–20 μm.

If the average thickness of the surface layer 52 is less than the lower limit value described above, there is a possibility that the following problems will be raised. Namely, depending on the material to be used for the surface layer 52, there is a case that cooling ability becomes too high. When such a material is used for the surface layer 52, a cooling rate becomes too large in the vicinity of the roll contact surface 81 of the melt spun ribbon 8 even though it has a considerably large thickness, thus resulting in the case that amorphous structure be produced at that portion. On the other hand, in the vicinity of the free surface 82 of the melt spun ribbon 8 where the heat conductivity is relatively low, the cooling rate becomes small as the thickness of the melt spun ribbon 8 increases, so that crystal grain size is liable to be coarse. Namely, this leads to the case that the crystal grain size is liable to be coarse in the vicinity of the free surface 82 of the obtained melt spun ribbon 8 and that amorphous structure is liable to be produced in the vicinity of the roll contact surface 81 of the melt spun ribbon 8, which results in the case that satisfactory magnetic properties can not be obtained. In this regard, even if the thickness of the melt spun ribbon 8 is made small by increasing the peripheral velocity of the cooling roll 5, for example, in order to reduce the crystal grain size in the vicinity of the free surface 82 of the melt spun ribbon 8, this in turn leads to the case that the melt spun ribbon 8 has more random amorphous structure in the vicinity of the roll contact surface 81 of the obtained melt spun ribbon 8. In such a melt spun ribbon 8, there is a case that sufficient magnetic properties will not be obtained even if it is subjected to a heat treatment after manufacturing thereof.

On the other hand, if the average thickness of the surface layer 52 exceeds the above upper limit value, the cooling rate becomes slow and thereby the crystal grain size becomes coarse, thus resulting in the case that magnetic properties become poor.

The method for forming the surface layer 52 is not limited to a specific method. However, it is preferable to employ a chemical vapor deposition (CVD) method such as heat CVD, plasma CVD, and laser CVD and the like, or a physical vapor deposition method (PVD) such as vapor deposition, spattering and ion-plating and the like. According to these methods, it is possible to obtain a surface layer having an uniform thickness with relative ease, so that it is not necessary to perform machining work onto the surface thereof after formation of the surface layer 52. Further, the surface layer 52 may be formed by means of other method such as electro plating, immersion plating, elecroless plating, and metal spraying and the like. Among these methods, the metal spraying is particularly preferred. This is because when the surface layer 52 is formed by means of the method, the surface layer 52 can be firmly adhered or bonded to the roll base 51.

Further, prior to the formation of the surface layer 52 onto the outer circumferential surface of the roll base 51, a pre-treatment may be made to the outer surface of the roll base 51. Examples of such a pre-treatment include washing treatment such as alkaline wash, oxide wash and wash using organic solvent and the like, and primer treatment such as blasting, etching and formation of a plating layer and the like. In this way, the surface layer 52 is more firmly bonded with the roll base 51 after the formation of the surface layer 52. In addition, by carrying out the primer treatment as described above, it becomes possible to form an uniform and precise surface layer 52, so that the obtained cooling roll 5 has less dispersion in its heat conductivities at various portions thereof.

Dimple Correcting Means

Figure 4:
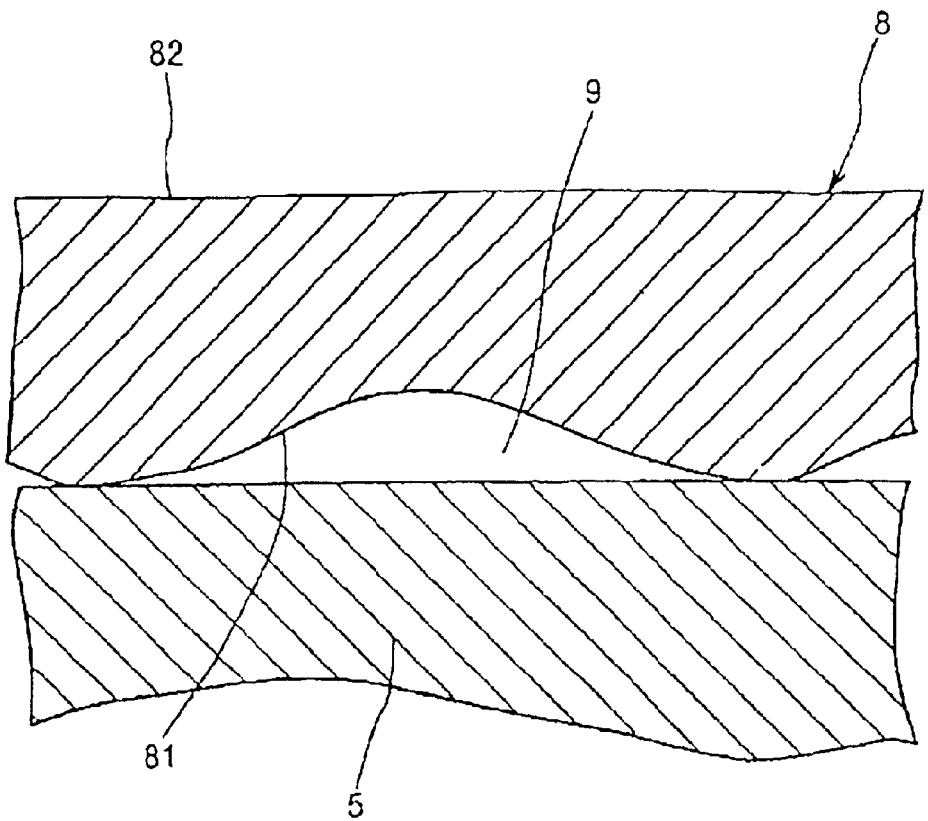
FIG. 4 is a cross-sectional view which schematically shows the state caused at the vicinity of the colliding section of the molten alloy with the cooling roll of the conventional melt spinning apparatus which manufactures a ribbon-shaped magnetic material by means of a single roll method.

As described later, the melt spun ribbon 8 is manufactured by colliding a molten alloy 6 of a magnetic material onto the circumferential surface 53 of the cooling roll 5 to quench (cool) it. At this time, there is case that dimples are produced or formed on the roll contact surface 81 of the melt spun ribbon 8 since gas has entered between the circumferential surface 53 and the puddle 7 of the molten alloy 6. As shown in FIG. 4, since portions to which gas has entered are cooled with the state that the gas is being stored therein, dimples are formed on the roll contact surface 81 of the obtained melt spun ribbon 8 (see FIG. 6). Further, the portions of the puddle 7 which are in contact with the entered gas have relatively smaller cooling rate as compared with other portions of the puddle 7, thus leading to coarse of crystal grain sizes. As a result, the obtained melt spun ribbon 8 has large variations or dispersions in its crystal grain sizes and magnetic properties. This tendency becomes prominent as the area of each dimple 9 and the total area of the dimples 9 become large.

In view of the above problem, in the circumferential surface 53 of the cooling roll 5 of the present invention, there is provided dimple correcting means for dividing dimples 9 to be produced on the roll contact surface 81 of the melt spun ribbon

Figure 5:
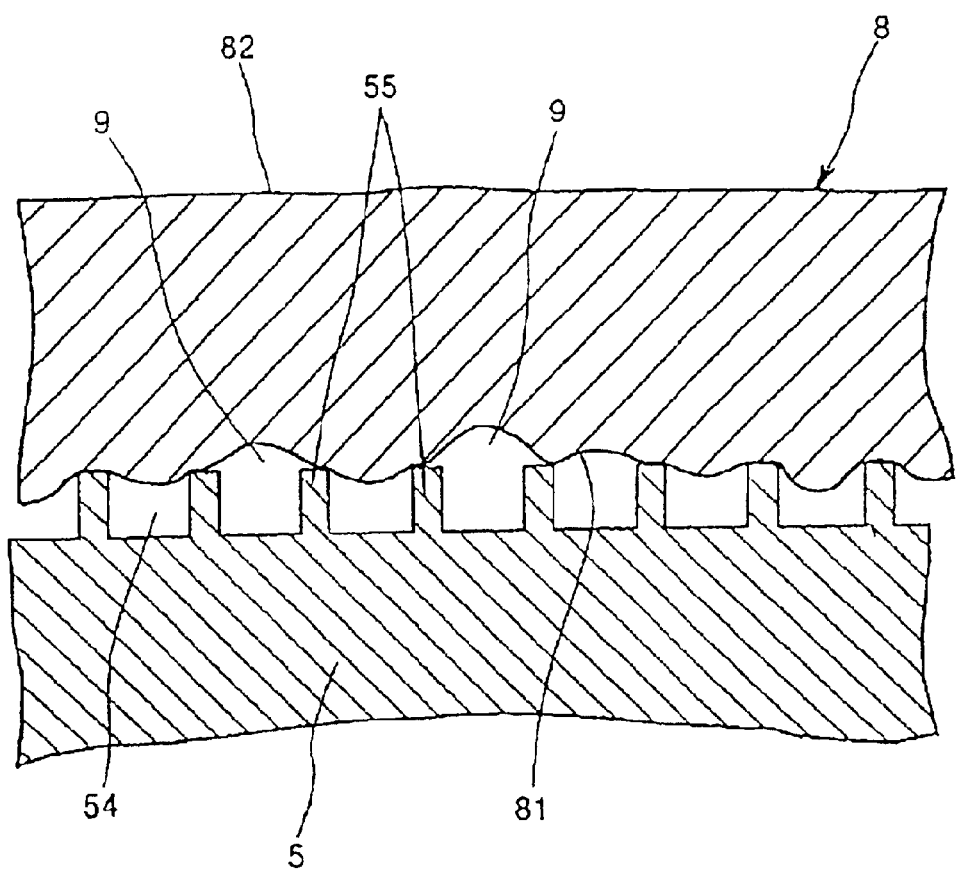
FIG. 5 is a cross-sectional view which schematically shows the state caused at the vicinity of the colliding section of the molten alloy with the cooling roll of the melt spinning apparatus shown in FIG. 1.
Figure 7:
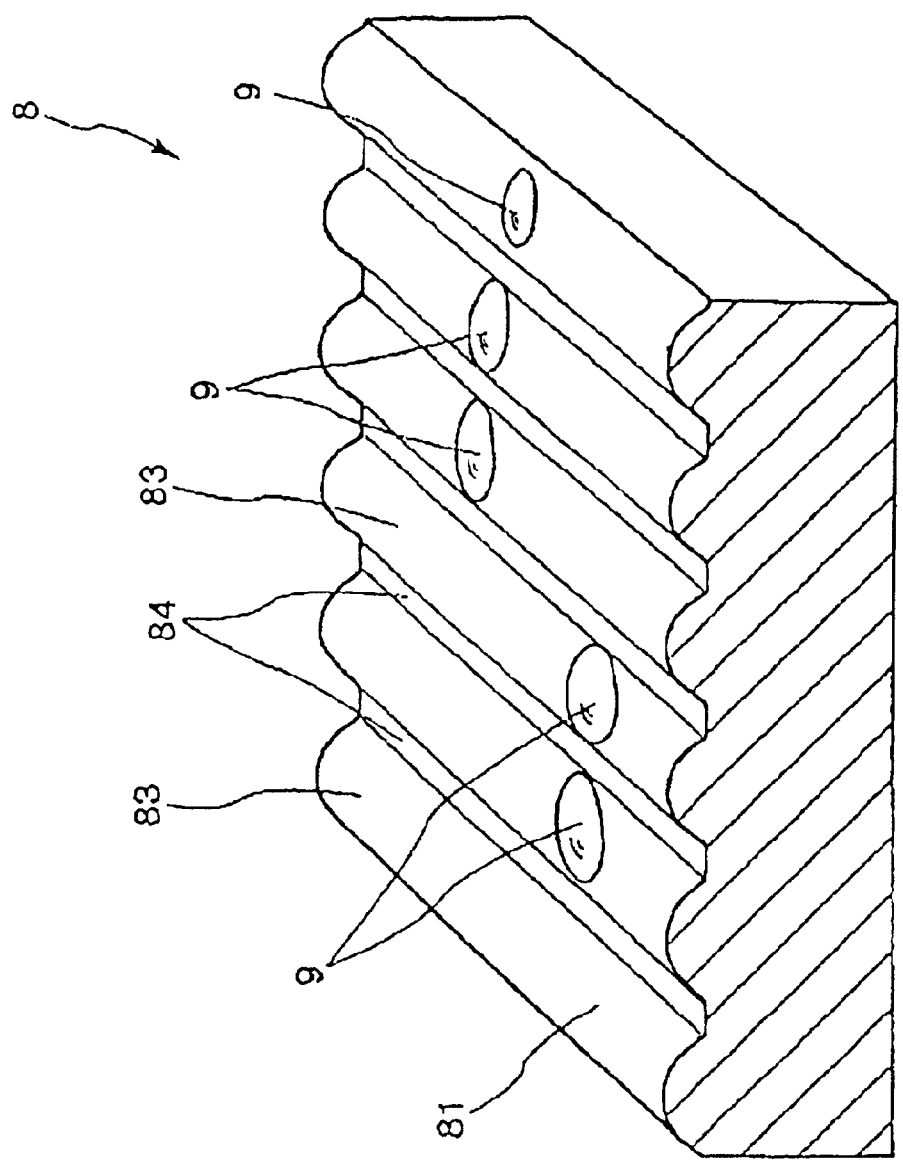
FIG. 7 is a perspective view which schematically shows the surface condition of the ribbon-shaped magnetic material manufactured by the melt spinning apparatus shown in FIG. 1.

8. By providing such dimple dividing means on the cooling roll 5, dimples 9 are produced or formed with a state that they are divided by the grooves 84 as shown in FIGS. 5 and 7. Further, due to the gas expelling effect by the grooves 84 (described later), at least a part of the gas which has entered between the circumferential surface 53 and the puddle 7 is expelled through the grooves 54, an amount of the gas remaining between the circumferential surface 53 and the puddle 7 becomes small. For these reasons, the area of each of dimples produced on the roll contact surface 81 of the obtained melt spun ribbon 8 becomes small, and therefore the total area of the produced dimples also becomes small (see FIG. 7). This means that the dispersion in the cooling rates at the various portions of the puddle 7 becomes small, so that it is possible to obtain a melt spun ribbon having small dispersion in its crystal grain sizes and having excellent magnetic properties.

In the example shown in the drawings, the dimple correcting means is constructed from a plurality of grooves 54 formed in the circumferential surface 53 of the cooling roll 5 in parallel with the rotational direction of the cooling roll 5. In this connection, it is to be noted that between the adjacent grooves 54, ridges 55 are existed. In the present invention, thus formed ridges 55 function as the dimple correcting means.

By forming such grooves 54 in the circumferential surface 53 of the cooling roll 5, the gas that has entered between the circumferential surface 53 and the puddle 7 is capable of entering the grooves 54 and then flowing through the grooves 54. Therefore, the gas that has entered between the circumferential surface 53 and the puddle 7 is expelled through the grooves in accordance with the rotation of the cooling roll 5. Due to such effect (hereinafter, referred to as "gas expelling effect"), the puddle 7 becomes brought into contact with the circumferential surface 53 at the portions where the gas has entered. When the puddle 7 contacts with the circumferential surface 53 In this way, dimples 9 are produced with a state that they are divided by the ridges 55 as shown in FIG. 7, so that the area of each of the dimples becomes small. In addition, the amount of the gas remaining between the puddle 7 and the circumferential surface 53 becomes small, the total area of the produced dimples also become small. As a result, dispersion in the cooling rates at various portions of the puddle 7 becomes small, so that it becomes possible to obtain a melt spun ribbon 8 having small dispersion in its crystal grain sizes and having excellent magnetic properties.

In this connection, it is to be noted that although in the example shown in the drawings a plurality of ridges 55 are formed, at least one ridge is sufficient in this invention.

The average value of the width $L_1$ of each groove 54 (the width of the groove at an opening portion in the circumferential surface 53) is preferably set to be 0.5–90 μm, and more preferably 1–50 μm. If the average value of the width $L_1$ of the groove 54 is less than the smallest value, the gas expelling effect for expelling the gas which has entered between the circumferential surface 53 and the puddle 7 is lowered. On the other hand, if the average value of the width $L_1$ of the groove 54 exceeds the largest value, there is a case that large dimples are produced at the portions of the grooves 54 so that the crystal grain size becomes coarse.

Further, the average value of the width $L_2$ of the ridge 55 (at the maximum width portion of the ridge) is preferably set to be 0.5 to 95 μm, and more preferably 1 to 50 μm. If the average value $L_2$ of the ridge 55 is less than the lowest value, the ridges will not function as the dimple correcting means sufficiently, so that there is a case that huge dimples are formed on the roll contact surface. On the other hand, if the average value $L_2$ of the ridge 55 exceeds the above upper limit value, the surface area of the ridges becomes too large, thus resulting in the case that dimples are formed between the ridges and the puddle.

The average value of the depth (maximum depth) $L_3$ of each groove 54 (or the average value of the maximum height of the ridge $L_3$ of each ridge 55) is preferably set to be 0.5–20 μm, and more preferably 1–10 μm. If the average value of the depth $L_3$ of the groove 54 is less than the smallest value, there is a case that the gas expelling effect for expelling the gas which has entered between the circumferential surface 53 and the puddle 7 is lowered so that the effect as the dimple correcting means can not be sufficiently exhibited. On the other hand, if the average value of the depth $L_3$ of the groove 54 exceeds the largest value, the flow rate of the gas flowing in the groove increases so that the gas flow tends to be turbulent flow with eddies, which results in the case that the effect of the dimple correcting means can not be sufficiently exhibited.

The average value of the pitch $L_4$ between the adjacent grooves 54 (or the average value of the pitch $L_4$ between the adjacent ridges 55) is an important factor for adjusting or determining the size of each of dimples 9 to be formed on the roll contact surface 81 of the melt spun ribbon 8 as well as the total area of the formed dimples 9. Preferably, the average value of the pitch $L_4$ between the adjacent grooves 54 (or the average value of the pitch $L_4$ between the adjacent ridges 55) is set to be 0.5–100 μm, and more preferably 3–50 μm. If the average value of the pitch $L_4$ is within this range, each ridge 55 effectively functions as the dimple correcting means, and the interval between the contacting portion and the non-contacting portion of the circumferential surface 53 with respect to the puddle 7 can be made sufficiently small.

With this result, the difference in the cooling rates between the portions of the puddle that are in contact with the cooling roll 5 and the portions of the puddle that do not contact with the cooling roll 5 becomes sufficiently small, so that it is possible to obtain a melt spun ribbon 8 having small dispersion in its grain sizes and magnetic properties.

The ratio of the area of the grooves 54 (or ridges 55) with respect to the area of the circumferential surface 53 when they are projected on the same plane should preferably be equal to or larger than 10%, and more preferably lies in the range of 30–99.5%. If the ratio of the projected area of the grooves 54 (or ridges 55) with respect to the projected area of the circumferential surface 53 is less than 10%, it is not possible to provide sufficient gas expelling flow paths for expelling the gas that has entered between the puddle 7 and the circumferential surface 53, so that the gas is liable to remain between the puddle 7 and the circumferential surface 53, thus leading to the case that huge dimples be produced.

Various methods can be used for forming the grooves 54 (or ridges 55) in the circumferential surface 53 of the cooling roll 5. Examples of the methods include various machining processes such as cutting, transfer (pressure rolling), gliding, blasting and the like, laser processing, electrical discharge machining, and chemical etching and the like. Among these methods, the machining process, especially gliding is particularly preferred, since according to the gliding the width and depth of each groove and the pitch of the adjacent grooves can be relatively easily adjusted with high precision as compared with other methods.

In this connection, it is to be noted that the ridges 55 are constructed from the resulting form of the circumferential surface 53 which are obtained after the grooves 54 have been formed in the circumferential surface 53 by the method mentioned above.

Figure 8:
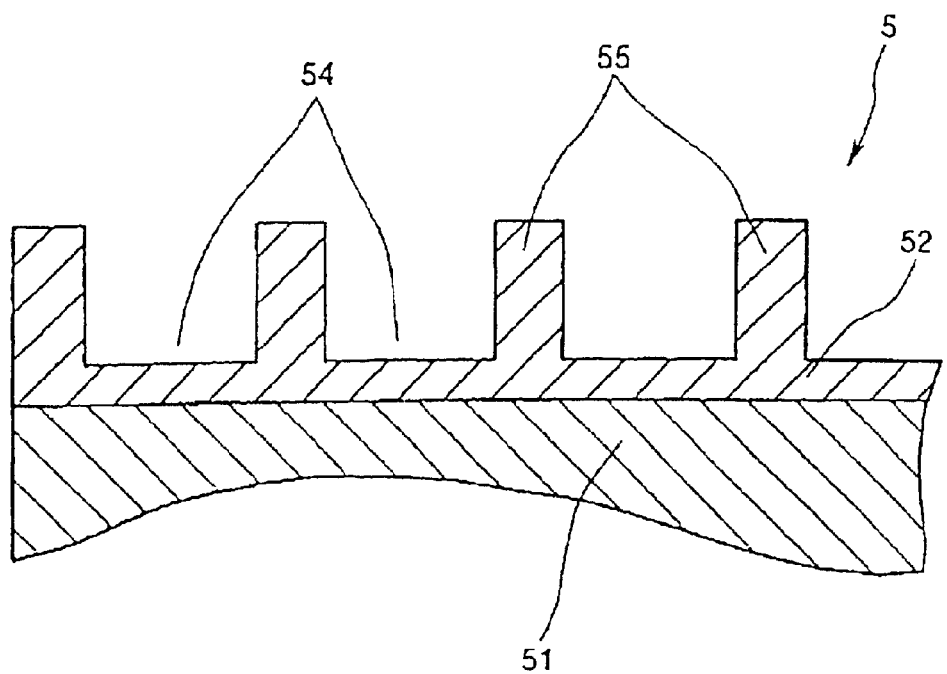
FIG. 8 is an illustration for explaining a method of forming a dimple correcting means.
Figure 9:
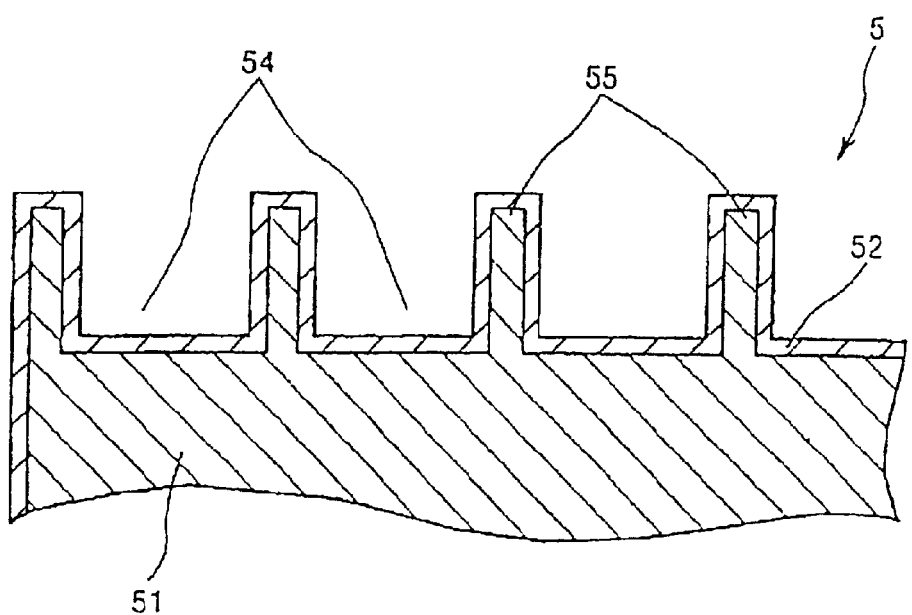
FIG. 9 is an illustration for explaining another method of forming the dimple correcting means.

In the case where the surface layer 52 is provided on the outer circumferential surface of the roll base 51 (that is, the case where the surface layer 52 is not integrally formed with the roll base 51), the grooves 54 and ridges 55 may be directly formed in the surface layer 52 by means of the method described above, or may be formed by using other way. Specifically, as shown in FIG. 8, after the formation of the surface layer 52, the grooves 54 and ridges 55 can be formed in the surface layer 52 by means of the method described above. Alternatively, as shown in FIG. 9, it is also possible to form grooves 54 and ridges 55 onto the outer circumferential surface of the roll base 51 by means of the method described above, and then to form a surface layer 52 thereon. In the latter way, the thickness of the surface layer 52 is made small in comparison with the depth of each groove 54 or the height of each ridge 55 formed in the roll base 51. With this result, the ridges 55 acting as the dimple correcting means can be formed in the circumferential surface 53 without performing any machining work for the surface of the surface layer 52, According to this way, since no machining work is performed for the surface of the surface layer 52, the surface roughness Ra of the circumferential surface 53 can be made considerably small without polishing which is normally made in the final stage.

In this connection, it is to be noted that in each of FIG. 3 and FIG. 5 a boundary surface between the roll base and the surface layer is omitted from the drawing (in each of FIGS. 11, 13, 15, 17 and 18 of which explanation will be made later, a boundary surface is also omitted).

Alloy Composition of Magnetic Material

The magnetic material (including the ribbon shaped magnetic material and the powdered magnetic material) according to the present invention is composed of an alloy composition represented by the formula of $R_x(Fe_{1-y}CO_y)_{100-x-z}B_z$ (where R is at least one rare-earth element, x is 10–15 at %, y is 0–0.30, and z is 4–10 at %). By using the magnetic material having such an alloy composition, it becomes possible to obtain magnets having excellent magnetic properties and heat resistance, in particular.

Examples of the rare-earth elements R include Y, La, Ce, Pr, Nd, Pm, Sm, Eu, Gd, Tb, Dy, Ho, Er, Tm, Yb, Lu, and a misch metal. In this connection, R may include one kind or two or more kinds of these elements.

The content of R is set at 10–15 at %. When the content of R is less than 10 at %, sufficient coercive force cannot be obtained. On the other hand, when the content of R exceeds 15 at %, the abundance ratio of the $R_2TM_{14}B$ phase (hard magnetic phase) in the composite structure is lowered, thus resulting in the case that sufficient remanent magnetic flux density can not be obtained.

Here, it is preferable that R includes the rare-earth elements Nd and/or Pr as its principal ingredient. The reason for this is that these rare-earth elements enhance the saturation magnetization of the $R_2TM_{14}B$ phase (hard magnetic phase) which will be described hereinbelow in more details, and are effective in realizing satisfactory coercive force as a magnet.

Moreover, it is preferable that R includes Pr and its ratio to the total mass of R is 5–75%, and more preferably 20–60%. This is because when the ratio lies within this range, it is possible to improve the coercive force (coercivity) and the rectangularity without causing a drop in the remanent magnetic flux density.

Furthermore, it is also preferable that R includes Dy and its ratio to the total mass of R is equal to or less than 14%. When the ratio lies within this range, the coercive force can be improved without causing a marked drop in the remanent magnetic flux density, and the temperature characteristic (such as heat stability) can be also improved.

Cobalt (Co) is a transition metal element having properties similar to Fe. By adding Co, that is by substituting a part of Fe by Co, the Curie temperature is elevated and the temperature characteristic of the magnetic powder is improved. However, if the substitution ratio of Fe by Co exceeds 0.30, the coercive force is lowered due to decrease in crystal magnetic anisotropy and the remanent magnetic flux density tends to fall off. The range of 0.05–0.20 of the substitution ratio of Fe by Co is more preferable since in this range not only the temperature characteristic but also the remanent magnetic flux density itself are improved.

Boron (B) is an element which is important for obtaining high magnetic properties, and its content is set at 4–10 at %. When the content of B is less than 4 at %, the rectangularity of the B–H (J–H) loop is deteriorated. On the other hand, when the content of B exceeds 10 at %, the nonmagnetic phase increases and the remanent magnetic flux density drops sharply.

In addition, for the purpose of further improving the magnetic properties, at least one other element selected from the group comprising Al, Cu, Si, Ga, Ti, V, Ta, Zr, Nb, Mo, Hf, Ag, Zn, P, Ge, Cr and W (hereinafter, this group is referred to as "Q") may be contained as needed. When containing the element belonging to Q, it is preferable that the content thereof is equal to or less than 2.0 at %, and it is more preferable that the content thereof lies within the range of 0.1–1.5 at %, and it is the most preferable that the content thereof lies within the range of 0.2–10 at %.

The addition of the element belonging to Q makes it possible to exhibit an inherent effect of the kind of the element. For example, the addition of Al, Cu, Si, Ga, V, Ta, Zr, Cr or Nb exhibits an effect of improving corrosion resistance.

Furthermore, it is also preferred that the magnetic material of the present invention is constituted from a $R_2TM_{14}B$ phase (here, TM is at least one transition metal) which is a hard magnetic phase. When the magnetic material is mainly formed from the $R_2TM_{14}B$ phase, the coercive force is particularly enhanced and the heat resistance is also improved.

In this case, it is preferred that the volume ratio of the $R_2TM_{14}B$ phase with respect to the whole structural composition of the magnetic material is equal to or greater than 80%, and it is more preferable that the volume ratio is equal to or greater than 85%. If the volume ratio of the $R_2TM_{14}B$ phase with respect to the whole structural composition of the magnetic material is less than 80%, the coercive force and heat resistance tend to fall off.

Further, in such $R_2TM_{14}B$ phase, it is also preferred that the average crystal grain size is equal to or less than 500 nm, and the average crystal grain size equal to or less than 200 nm is further preferred, and the average crystal grain size of 10–120 nm is furthermore preferred. If the average crystal grain size of the $R_2TM_{14}B$ phase exceeds 500 nm, there arises a case that magnetic properties especially coercive force and rectangularity can not be sufficiently enhanced.

In this connection, it is to be noted that the magnetic material may contain additional composite structure other than the $R_2TM_{14}B$ phase (e.g. hard magnetic phase other than the $R_2TM_{14}B$ phase, soft magnetic phase, paramagnetic phase, nonmagnetic phase, amorphous structure or the like).

Manufacture of Ribbon-shaped Magnetic Material

Hereinbelow, description will be made with regard to the manufacturing of the ribbon-shaped magnetic material (that is, melt spun ribbon) using the cooling roll 5 described above.

As described above, the ribbon-shaped magnetic material is manufactured by colliding a molten alloy of the magnetic material onto the circumferential surface of the cooling roll to cool and then solidify it. Hereinbelow, one example thereof will be described.

As shown in FIG. 1, the melt spinning apparatus 1 is installed in a chamber (not shown), and it is operated under the condition where the interior of the chamber is filled with an inert gas or other kind of ambient gas. In particular, in order to prevent oxidation of a melt spun ribbon 8, it is preferable that the ambient gas is an inert gas. Examples of such an inert gas include argon gas, helium gas, nitrogen gas or the like.

The pressure of the ambient gas is not particularly limited to a specific value, but 1–760 Torr is preferable.

A predetermined pressure which is higher than the internal pressure of the chamber is applied to the surface of the liquid of the molten alloy 6 in the cylindrical body 2. The molten alloy 6 is injected from the nozzle 3 by the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level.

The molten alloy injecting pressure (that is, the differential pressure between the pressure of the ambient gas in the chamber and the summed pressure of the pressure applied to the surface of the liquid of the molten alloy 6 in the cylindrical body 2 and the pressure exerted in the cylindrical body 2 in proportion to the liquid level) is not particularly limited to a specific value, but 10–100 kPa is preferable.

In the melt spinning apparatus 1, a magnetic material (alloy) is placed in the cylindrical body 2 and it is melted by heating with the coil 4, and then the molten alloy 6 is discharged from the nozzle 3. Then, as shown in FIG. 1, the molten alloy 6 collides with the circumferential surface 53 of the cooling roll 5, and after the formation of a puddle 7, the molten alloy 6 is cooled down rapidly to be solidified while being dragged along the circumferential surface 53 of the rotating cooling roll 5, thereby forming a melt spun ribbon 8 continuously or intermittently. Under the situation, if gas (ambient gas) enters between the puddle 7 and the circumferential surface 53, dimples 9 are produced on the roll contact surface of the melt spun ribbon 8, as described above. However, in this embodiment, since the dimple correcting means (ridges 55) is provided in the circumferential surface 53 of the cooling roll 5, these dimples are produced with a state that they are divided by the grooves formed on the roll contact surface. The melt spun ribbon 8 thus formed is soon released from the circumferential surface 53, and the melt spun ribbon 8 proceeds in the direction of an arrow B in FIG. 1.

Since the dimple correcting means is provided in the circumferential surface 53 of the cooling roll 5 in this way, formation of huge dimples is prevented and thereby ununiform cooling of the puddle 7 is also prevented. As a result, it is possible to obtain a melt spun ribbon 8 having less dispersion in its crystal grain sizes and having excellent magnetic properties.

In this connection, it is to be noted that when manufacturing such a melt spun ribbon 8, it is not always necessary to install the nozzle 3 just above the rotation axis 50 of the cooling roll 5.

The optimum range of the peripheral velocity of the cooling roll 5 depends upon the composition of the molten alloy, the structural material (composition) of the surface layer 52, and the surface condition of the circumferential surface 53 (especially, the wettability of the circumferential surface 53 with respect to the molten alloy 6), and the like. However, for the enhancement of the magnetic properties, a peripheral velocity in the range of 5 to 60 m/s is normally preferable, and 10 to 40 m/s is more preferable. If the peripheral velocity of the cooling roll 5 is less than the above lower limit value, the cooling rate of the molten alloy 6 (puddle 7) is decreased. This tends to increase the crystal grain size, thus leading to the case that the magnetic properties are lowered. On the other hand, when the peripheral velocity of the cooling roll 5 exceeds the above upper limit value, the cooling rate is too high, and thereby amorphous structure becomes dominant. In this case there is a case that the magnetic properties can not be sufficiently improved even if a heat treatment described below is given in the later stage.

It is preferred that thus obtained melt spun ribbon 8 has uniform width w and thickness t. In this case, the average thickness t of the melt spun ribbon 8 should preferably lie in the range of 8–50 µm and more preferably lie in the range of 10–40 µm. If the average thickness t is less than the lower limit value, amorphous structure becomes dominant, so that there is a case that the magnetic properties can not be sufficiently improved even if a heat treatment is given in the later stage. Further, productivity per a unit time is also lowered. On the other hand, if the average thickness t exceeds the above upper limit value, the crystal grain size at the side of the free surface 82 of the melt spun ribbon 8 tends to be coarse, so that there is a case that the magnetic properties are lowered.

In the spun ribbon 8 of the present invention obtained as described above, the surface shape or form of the circumferential surface 53 of the cooling roll 5 is transferred (completely or partially) to at least a part of the roll contact surface 81 of the melt spun ribbon 8. Consequently, on the roll contact surface 81 of the melt spun ribbon 8, ridges 83 and grooves (or recesses) 84 which respectively correspond to the surface shape of the circumferential surface 53 of the cooling roll 5 (that is, the grooves 54 and ridges 55) are formed. Since the ridges 83 and grooves 84 are formed on the roll contact surface 81 of the melt spun ribbon 8 in this way, dimples are produced with a state that they are effectively divided by these grooves 84 such that the area of each of the dimples is small. Further, the total area of the dimples 9 is also decreased because of the gas expelling effect by the grooves 54 formed in the circumferential surface 53 of the cooling roll 5, as described above. With this result, it is possible to obtain a melt spun ribbon 8 having less dispersion in its crystal grain sizes at various portions thereof and having excellent magnetic properties.

Further, in the present invention, it is preferred that the ratio of the projected area of huge dimples 9 (here, a huge dimple means a dimple having an area more than $2000\,\mu m^2$) which are formed on the roll contact surface 81 of the melt spun ribbon 8 upon solidification thereof is less than 10%, and more preferably less than 5%. If the ratio exceeds 10%, the total area of portions of the melt spun ribbon 8 having extremely small cooling rate (that is, portions of the roll contact surface 81 of the melt spun ribbon 8 where the huge dimples are formed, in particular apart around the center of each huge dimple) becomes large as compared with the total area of portions of the melt spun ribbon 8 that are in contact with the cooling roll 5, so that magnetic properties of the melt spun ribbon 8 are lowered as a whole.

In this regard, it is to be noted that the ratio of the projected area of the huge dimples 9 is calculated as a ratio of the projected area with respect to a predetermined area on the roll contact surface 81. In this case, it is preferred that the ratio is an average value obtained from several sampling points on the roll contact surface 81.

Further, in the present invention, it is preferred that the ratio of the projected area of dimples 9 (all dimples) which are formed on the roll contact surface 81 of the melt spun ribbon 8 upon solidification thereof is less than 40%, and more preferably less than 30%. If the ratio of the projected area of the dimples is too large, the cooling rate upon solidification is lowered as a whole, so that crystal grain size becomes coarse and thereby magnetic properties of the obtained melt spun ribbon is also lowered.

Furthermore, the obtained melt spun ribbon 8 may be subjected to at least one heat treatment for the purpose of, for example, acceleration of recrystallization of the amorphous structure and homogenization of the structure. The conditions of this heat treatment may be, for example, a heating in the range of 400 to 900° C. for 0.2 to 300 min.

Moreover, in order to prevent oxidation, it is preferred that this heat treatment is performed in a vacuum or under a reduced pressure (for example, in the range of $1\times10^{-1}$ to $1\times10^{-6}$ Torr), or in a nonoxidizing atmosphere of an inert gas such as nitrogen gas, argon gas, helium gas or the like.

The melt spun ribbon (ribbon-shaped magnetic material) 8 obtained as in the above has a microcrystalline structure or a structure in which microcrystals are included in an amorphous structure, and exhibits excellent magnetic properties.

In the foregoing, the description was made with reference to the single roll method. However, it is of course possible to use a twin roll method. According to these quenching methods, the metallic structure (that is, crystal grain) can be formed into microstructure, so that these methods are particularly effective in improving magnetic properties of bonded magnets, especially coercive force thereof.

Manufacture of Powdered Magnetic Material (Magnetic Powder)

The powdered magnetic material (magnetic powder) of this invention is obtained by milling the melt spun ribbon (ribbon-shaped magnetic material) 8 which is manufactured as described above.

The milling method of the melt spun ribbon is not particularly limited, and various kinds of milling or crushing apparatus such as ball mill, vibration mill, jet mill, and pin mill maybe employed. In this case, in order to prevent oxidation, the milling process maybe carried out in vacuum or under a reduced pressure (for example, under a reduced pressure of $1\times10^{-1}$ to $1\times10^{-6}$ Torr), or in a nonoxidizing atmosphere of an inert gas such as nitrogen, argon, helium, or the like.

The average particle size (diameter) of the magnetic powder is not particularly limited. However, in the case where the magnetic powder is used for manufacturing bonded magnets (rare-earth bonded magnets) described later, in order to prevent oxidation of the magnetic powder and deterioration of the magnetic properties during the milling process, it is preferred that the average particle size lies within the range of 1 to 300 $\mu$m, more preferably within the range of 5 to 150 $\mu$m.

In order to obtain a better moldability of the bonded magnet, it is preferable to give a certain degree of dispersion to the particle size distribution of the magnetic powder. By so doing, it is possible to reduce the void ratio (porosity) of the bonded magnet obtained. As a result, it is possible to increase the density and the mechanical strength of the bonded magnet as compared with a bonded magnet having the same content of the magnetic powder, thereby enabling to further improve the magnetic properties.

Thus obtained magnetic powder may be subjected to a heat treatment for the purpose of, for example, removing the influence of stress introduced by the milling process and controlling the crystal grain size. The conditions of the heat treatment are, for example, heating at a temperature in the range of 350 to 850° C. for 0.2 to 300 min.

In order to prevent oxidation of the magnetic powder, it is preferable to perform the heat treatment in a vacuum or under a reduced pressure (for example, in the range of $1\times10^{-1}$ to $1\times1^{-6}$ Torr), or in a nonoxidizing atmosphere of an inert gas such as nitrogen gas, argon gas, and helium gas.

Thus obtained magnetic powder has a satisfactory bindability with binding resins (wettability of binding resins). Therefore, when a bonded magnet is manufactured using the magnetic powder described above, the bonded magnet has high mechanical strength as well as excellent thermal stability (heat resistance) and corrosion resistance. Consequently, it can be concluded that the magnetic powder is suitable for the manufacture of the bonded magnet, and the manufactured bonded magnet has high reliability.

Bonded Magnet and Manufacturing thereof

Hereinbelow, a description will be made with regard to the bonded magnet according to the present invention.

The bonded magnet according to the present invention is manufactured by binding the magnetic powder (powdered magnetic material) described above using a binding resin (binder).

As for the binder, either of a thermoplastic resin or a thermosetting resin may be employed.

Examples of the thermoplastic resin include polyamid (example: nylon 6, nylon 46, nylon 66, nylon 610, nylon 612, nylon 11, nylon 12, nylon 6–12, nylon 6–66); thermoplastic polyimide; liquid crystal polymer such as aromatic polyester; poly phenylene oxide: poly phenylene sulfide; polyolefin such as polyethylene, polypropylene and ethylene-vinyl acetate copolymer; modified polyolefin; polycarbonate; poly methyl methacrylate; polyester such as polyethylen terephthalate and poly butylene terephthalate; polyether; polyether ether ketone; polyetherimide; polyacetal; and copolymer, blended body, and polymer alloy having at least one of these materials as a main ingredient. In this case, a mixture of two or more kinds of these materials may be employed Among these resins, a resin containing polyamide as its main ingredient is particularly preferred from the viewpoint of especially excellent moldability and high mechanical strength. Further, a resin containing liquid crystal polymer and/or poly phenylene sulfide as its main ingredient is also preferred from the viewpoint of enhancing the heat resistance. Furthermore, these thermoplastic resins also have an excellent kneadability with the magnetic powder.

These thermoplastic resins provide an advantage in that a wide range of selection can be made. For example, it is possible to provide a thermoplastic resin having a good moldability or to provide a thermoplastic resin having good heat resistance and mechanical strength by appropriately selecting their kinds, copolymerization or the like.

On the other hand, examples of the thermosetting resin include various kinds of epoxy resins of bisphenol type, novolak type, and naphthalene-based, phenolic resins, urea resins, melamine resins, polyester (or unsaturated polyester) resins, polyimide resins, silicone resins, polyurethane resins, and the like. In this case, a mixture of two or more kinds of these materials may be employed.

Among these resins, the epoxy resins, phenolic resins, polyimide resins and silicone resins are preferable from the viewpoint of their special excellence in the moldability, high mechanical strength, and high heat resistance. In these resins, the epoxy resins are especially preferable. These thermosetting resins also have an excellent kneadability with the magnetic powder and homogeneity (uniformity) in kneading.

The unhardened thermosetting resin to be used maybe either in a liquid state or in a solid (powdery) state at a room temperature.

The bonded magnet according to this invention described in the above may be manufactured, for example, as in the following. First, the magnetic powder, a binding resin and an additive (antioxidant, lubricant, or the like) as needed are mixed and kneaded (e.g. warm kneading) to form a bonded magnet composite (compound) Then, thus obtained bonded magnet composite is formed into a desired magnet form in a space free from magnetic field by a molding method such as compaction molding (press molding), extrusion molding, or injection molding. When the binding resin used is a thermosetting type, the obtained green compact is hardened by heating or the like after molding.

In these three types of molding methods, the extrusion molding and the injection molding (in particular, the injection molding) have advantages in that the latitude of shape selection is broad and the productivity is high, for example. However, these molding methods require to ensure a sufficiently high fluidity of the compound in the molding machine in order to obtain satisfactory moldability. For this reason, in these methods it is not possible to increase the content of the magnetic powder, namely, it is not possible to make bonded magnets having high density, as compared with the case of the compaction molding method. In this invention, however, it is possible to obtain a high magnetic flux density as will be described later, so that excellent magnetic properties can be obtained even without making the bonded magnet high density. This advantage of the present invention can also be extended even in the case where bonded magnets are manufactured by the extrusion molding method or the injection molding method.

The content of the magnetic powder in the bonded magnet is not particularly limited, and it is normally determined by considering the kind of the molding method to be used and the compatibility of moldability and high magnetic properties. For example, it is preferred that the content is in the range of 75–99.5 wt %, and more preferably in the range of 85–97.5 wt %.

In particular, in the case of a bonded magnet manufactured by the compaction molding method, the content of the magnetic powder should preferably lie in the range of 90–99.5 wt %, and more preferably in the range of 93–98.5 wt %.

Further, in the case of a bonded magnet manufactured by the extrusion molding or the injection molding, the content of the magnetic powder should preferably lie in the range of 75–98 wt %, and more preferably in the range of 85–97 wt %.

The density $\rho$ of the bonded magnet is determined by factors such as the specific gravity of the magnetic powder contained in the bonded magnet and the content of the magnetic powder, and the void ratio (porosity) of the bonded magnet and the like in the bonded magnets according to this invention, the density $\rho$ is not particularly limited to a specific value, but it is preferable to be in the range of 4.5–6.6 $Mg/m^3$ and more preferably in the range of 5.5–6.4 $Mg/m^3$.

In this invention, since the remanent magnetic flux density and the coercive force of the magnetic powder are high, the bonded magnet formed from the magnetic powder provides excellent magnetic properties (especially, high maximum magnetic energy product $(BH)_{max}$) even when the content of the magnetic powder is relatively low. In this regard, it goes without saying that it is possible to obtain the excellent magnetic properties in the case where the content of the magnetic powder is high.

The shape, dimensions and the like of the bonded magnet manufactured according to this invention are not particularly limited. For example, as to the shape, all shapes such as columnar shape, prism-like shape, cylindrical shape (annular shape), circular shape, plate-like shape, curved plate-like shape, and the like are acceptable. As to the dimensions, all sizes starting from large-sized one to ultra-minuaturized one are acceptable. However, as repeatedly described in this specification, the present invention is particularly advantageous when it is used for miniaturized magnets and ultraminiaturized magnets.

Further, in the present invention, it is preferred that the coercive force $(H_{CJ})$ (coercive force at a room temperature) of the bonded magnet is 320 to 1200 k/m, and 400 to 800 kA/m is more preferable. If the coercive force $(H_{CJ})$ is lower than the lower limit value, demagnetization occurs conspicuously when a reverse magnetic field is applied, and the heat resistance at a high temperature is deteriorated. On the other hand, if the coercive force $(H_{CJ})$ exceeds the above upper limit value, magnetizability is deteriorated. Therefore, by setting the coercive force $(H_{CJ})$ to the above range, in the case where the bonded magnet is subjected to multipolar magnetization, a satisfactory magnetization can be accomplished even when a sufficiently high magnetizing field cannot be secured. Further, It is also possible to obtain a sufficient magnetic flux density, thereby enabling to provide high performance bonded magnets.

Furthermore, in the present invention, it is preferable that the maximum magnetic energy product $(BH)_{max}$ of the bonded magnet is equal to or greater than 40 $kJ/m^3$, more preferably equal to or greater than 50 $kJ/m^3$, and most preferably in the range of 70 to 120 $kJ/m^3$. If the maximum magnetic energy product $(BH)_{max}$ is less than 40 $kJ/m^3$, it is not possible to obtain a sufficient torque when used for motors depending on the types and structures thereof.

As described above, according to the magnetic material manufacturing method of this embodiment, since the ridges 55 acting as the dimple correcting means are provided on the cooling roll 5, dimples to be produced on the roll contact surface 81 of the melt spun ribbon 8 are formed in a divided state. Therefore, it is possible to prevent formation of huge dimples, so that dispersion or variation in the cooling rates becomes small. With this result, it is possible to obtain a melt spun ribbon having less dispersion in its crystal grain sizes and having stably high magnetic properties.

Therefore, bonded magnets manufactured from the obtained melt spun ribbons can also have high magnetic properties. Further, high magnetic properties can be obtained without pursing high density when manufacturing the bonded magnets. This means that the obtained bonded magnets can have improved moldability, dimensional accuracy, mechanical strength, corrosion resistance and heat resistance and the like.

Next, the second embodiment of the magnetic material manufacturing method according to the present invention will be described. Hereinbelow, a description will be made with regard to the magnetic material manufacturing method of the second embodiment by focusing on different points between the first and second embodiments, and explanation for the common points is omitted.

In this second embodiment, the shape or form of the dimple correcting means provided on the circumferential surface of the cooling roll which is used when the magnetic material is manufactured is different from that of the first embodiment.

Figure 10:
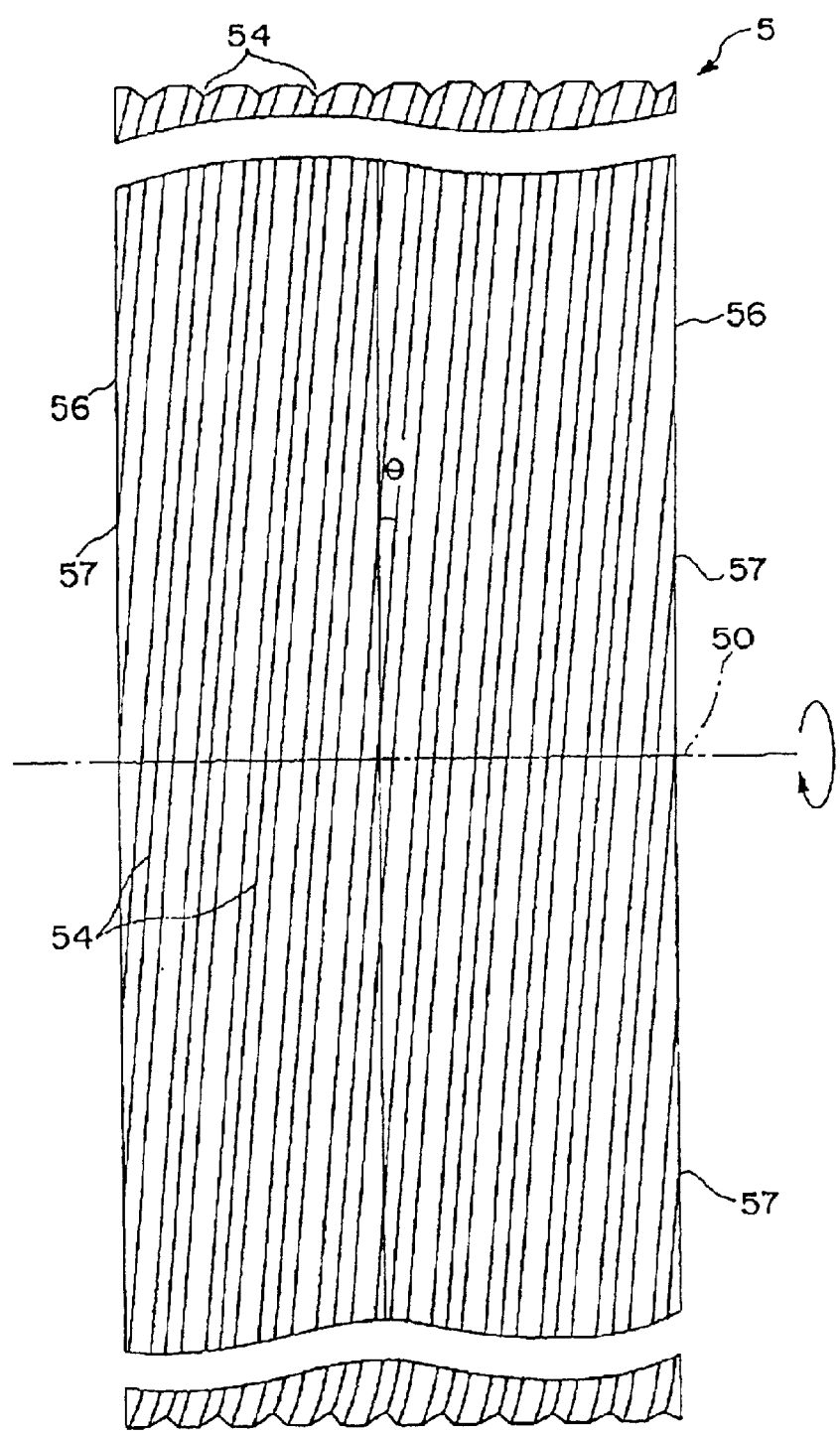
FIG. 10 is a front view which schematically shows a cooling roll used in a second embodiment of the manufacturing method of the present invention.
Figure 11:
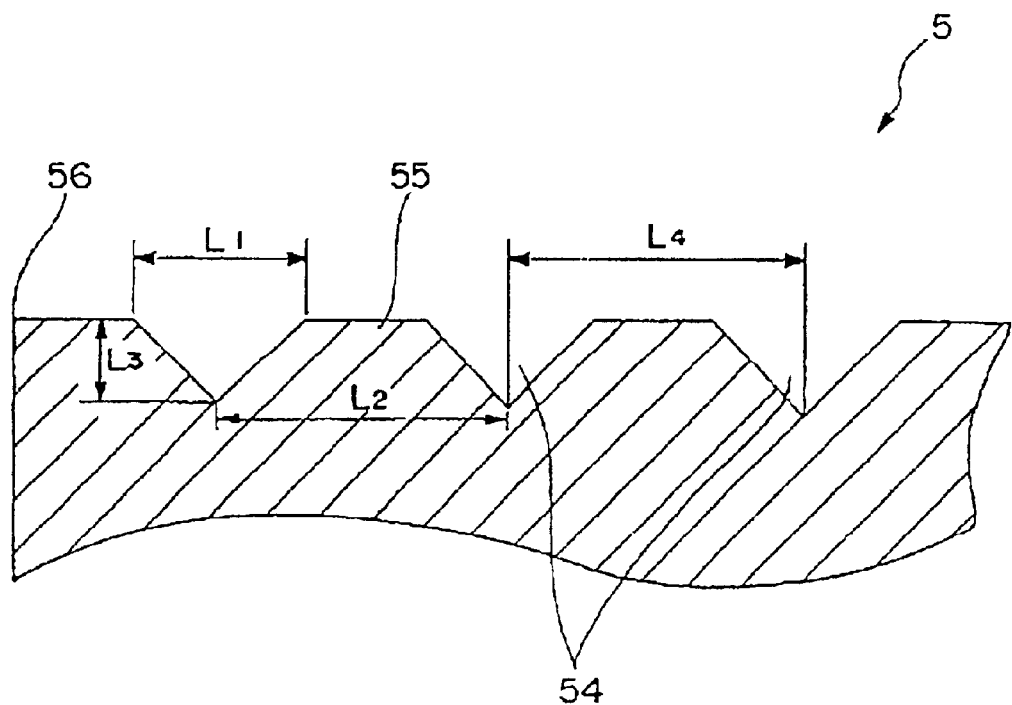
FIG. 11 is a sectional view which schematically shows the structure of a portion in the vicinity of the circumferential surface of the cooling roll shown in FIG. 10.

In this regard, FIG. 10 is a front view which schematically shows the cooling roll which is used in the magnetic material manufacturing method of the second embodiment of the present invention, and FIG. 11 is an enlarged sectional view which schematically shows the structure of the cooling roll shown in FIG. 10.

As shown in FIG. 10, the ridges 55 which act as the dimple correcting means are spirally formed with respect to the rotation axis 50 of the cooling roll 5. The ridges 55 having such spiral forms can be formed relatively easily over the entire of the circumferential surface 53. For example, such spiral grooves 54 can be formed by cutting the outer circumferential portion of the cooling roll 5 with a cutting tool such as a lathe which is moved in a constant speed in parallel with the rotation axis 50 of the cooling roll 5 under the state that the cooling roll 5 is being rotated in a constant speed. With this result, the grooves 54 having a spiral form with respect to the rotation axis 50 are formed, and the remaining portions of the circumferential surface 53 between the adjacent grooves 54 and 54 constitute the ridges 55.

In this regard, it is to be understood that the number of the spiral groove 54 (or ridge 55) may be one or more.

Further, the angle θ (absolute value) defined between the longitudinal direction of the groove 54 (or ridge 55) and the rotational direction of the cooling roll 5 should preferably be equal to or less than 30°, and more preferably equal to or less than 20°. If the angle θ is equal to or less than 30° the gas that has entered between the circumferential surface 53 and the puddle 7 can be expelled efficiently regardless of the peripheral velocity of the cooling roll 5. Consequently, division for dimples is more effectively achieved, so that the area of each dimple and the total area of the dimples can be made small further.

Further, the angle θ may be changed so as to have the same value or different values depending on locations on the circumferential surface 53. Further, when the two or more grooves 54 (or ridges 55) are formed, the angle θ may be changed in each of the grooves 54 (or ridges 55).

In this embodiment, the ends of each groove 54 are formed into openings 57 opened at the opposite edge portions 56 of the circumferential surface 53 in the end surfaces of the cooling roll 5, respectively. This arrangement makes it possible to discharge the gas which has been expelled from between the circumferential surface 53 and the puddle 7 to the lateral sides of the cooling roll 5 through the openings 57, so that it is possible to effectively prevent the discharged gas from reentering between the circumferential surface 53 and the puddle 7 again, thereby further improving the dimple correcting effect. Although in the above example the groove 54 has the openings 56 at the opposite ends thereof, such an opening may be provided at one of the ends thereof.

Next, the third embodiment of the magnetic material manufacturing method of the present invention will be described. Hereinbelow, a description will be made with regard to the magnetic material manufacturing method of the third embodiment by focusing on different points from the first and second embodiments, and explanation for the common points is omitted.

In this third embodiment, the shape or form of the dimple correcting means provided on the circumferential surface of the cooling roll which is used when the magnetic material is manufactured is different from those of the first and second embodiments.

Figure 12:
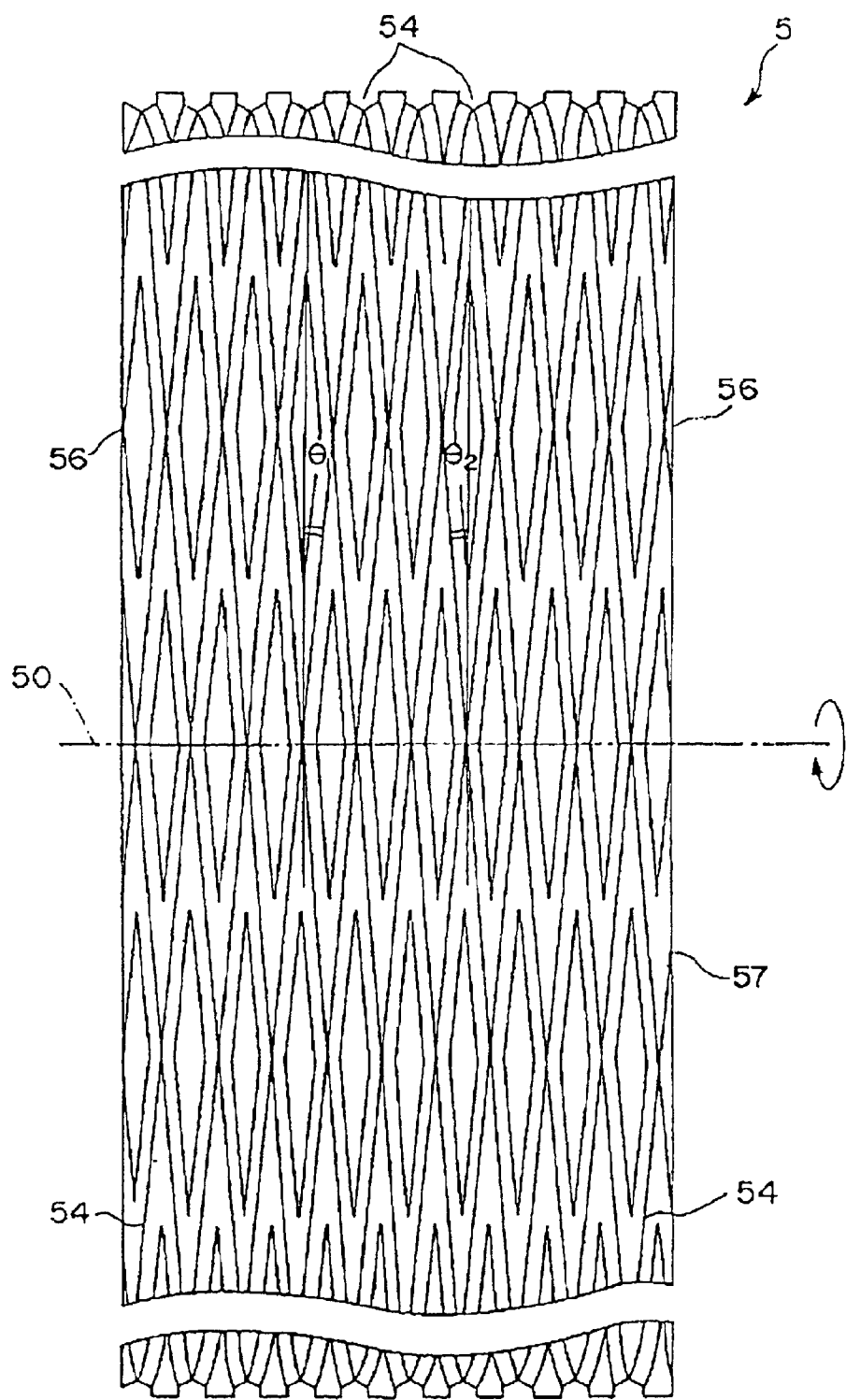
FIG. 12 Is a front view which schematically shows a cooling roll used in a third embodiment of the manufacturing method of the present invention.
Figure 13:
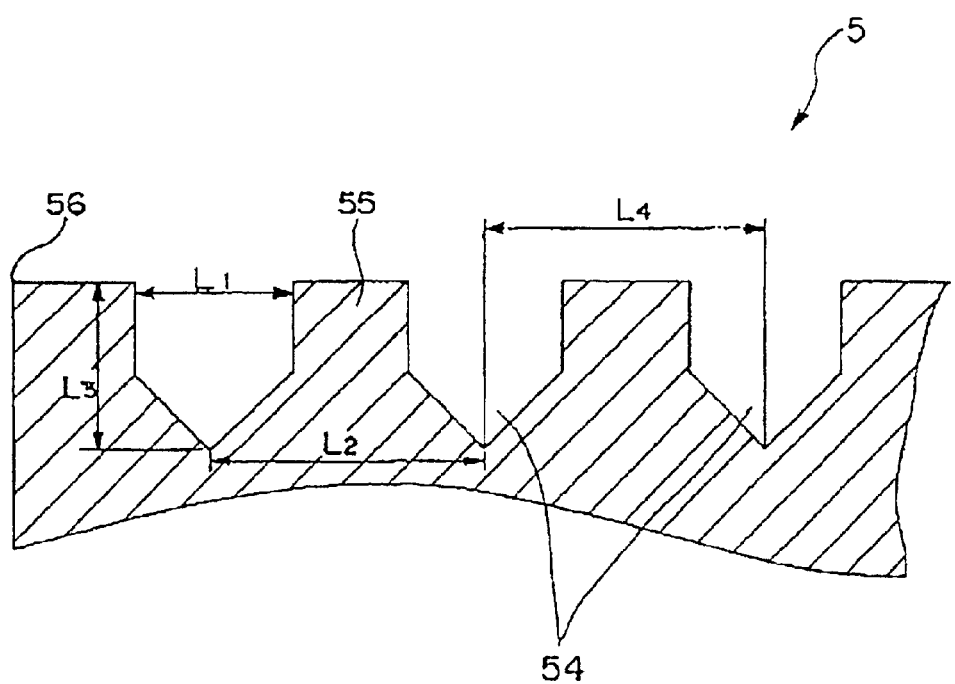
FIG. 13 is a sectional view which schematically shows the structure of a portion in the vicinity of the circumferential surface of the cooling roll shown in FIG. 12.

In this regard, FIG. 12 is a front view which schematically shows the cooling roll used in the third embodiment of the magnetic material manufacturing method of the present invention, and FIG. 13 is an enlarged sectional view which schematically shows the cooling roll 5 shown in FIG. 12.

As shown in FIG. 12, in the circumferential surface 53, there are formed at least two spiral grooves 54 of which spiral directions are different from each other so that these grooves 54 intersect to each other at many locations.

In the same manner as the second embodiment described above, in this embodiment the portions remaining in the circumferential surface 53 between the adjacent grooves 54 and 54 constitute the ridges 55.

In this embodiment, by forming such grooves that are spiraled in the opposite directions, the melt spun ribbon 8 receives laterally exerted force from the dextral spirals as well as laterally exerted force from the sinistral spirals and these forces are cancelled with each other. Therefore, the lateral movement of the melt spun ribbon 8 in FIG. 12 is suppressed so that the advancing direction of the melt spun ribbon 8 becomes stable.

Further, it is preferred that the angles (absolute value) defined between each of the longitudinal directions of the grooves 54 and the rotational direction of the cooling roll 5 (which are represented by $\theta_1$ and $\theta_2$ in FIG. 12) are in the same range as that of the angle θ described above with reference to the second embodiment.

Next, the fourth embodiment of the magnetic material manufacturing method of the present invention will be described Hereinbelow, a description will be made with regard to the magnetic material manufacturing method of the third embodiment by focusing on different points from the first, second and third embodiments, and explanation for the common points is omitted.

In this fourth embodiment, the shape or form of the dimple correcting means provided on the circumferential surface of the cooling roll which is used when the magnetic material is manufactured is different from those of the first, second and third embodiments.

Figure 14:
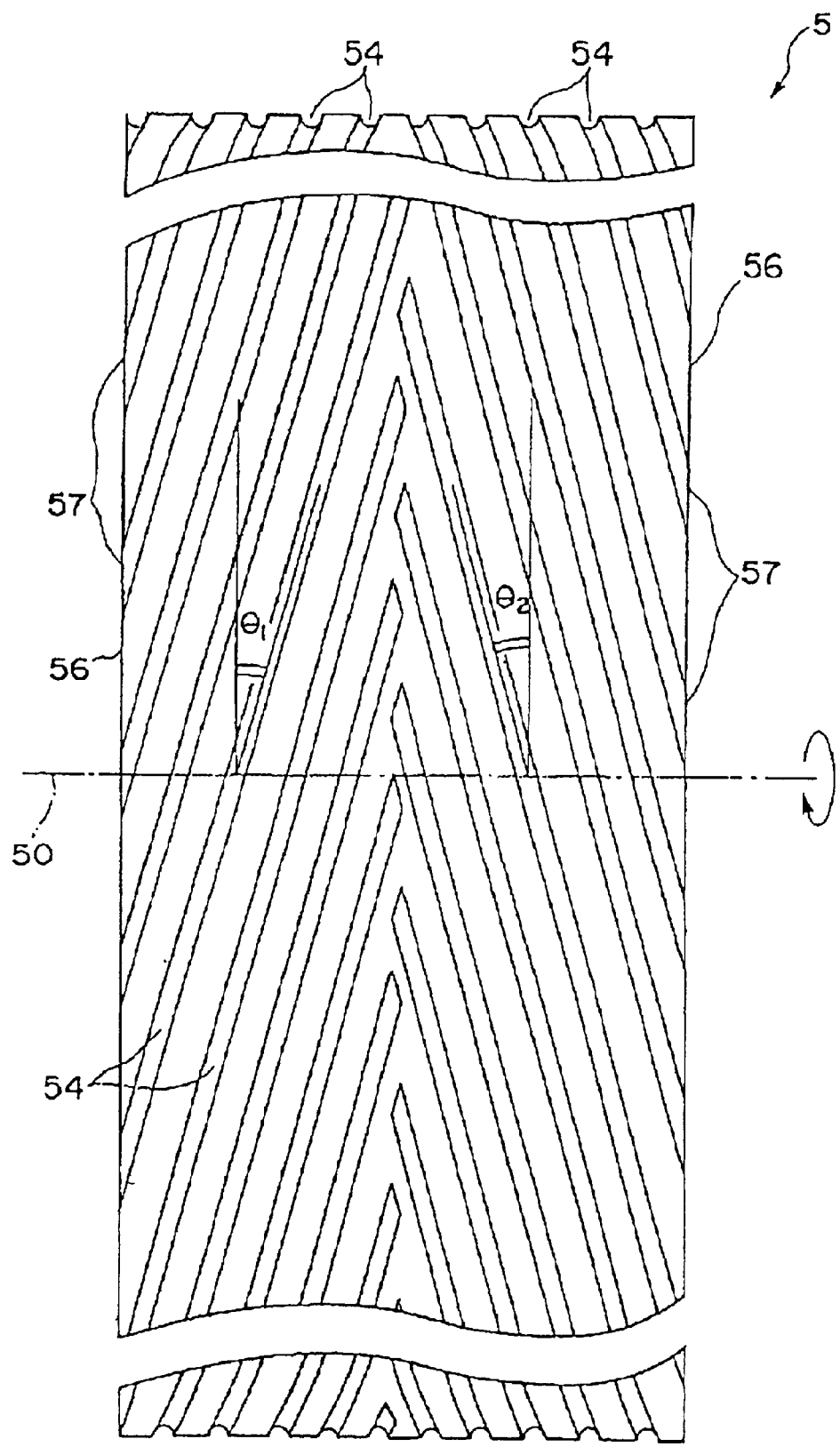
FIG. 14 is a front view which schematically shows a cooling roll used in a fourth embodiment of the manufacturing method of the present invention.
Figure 15:
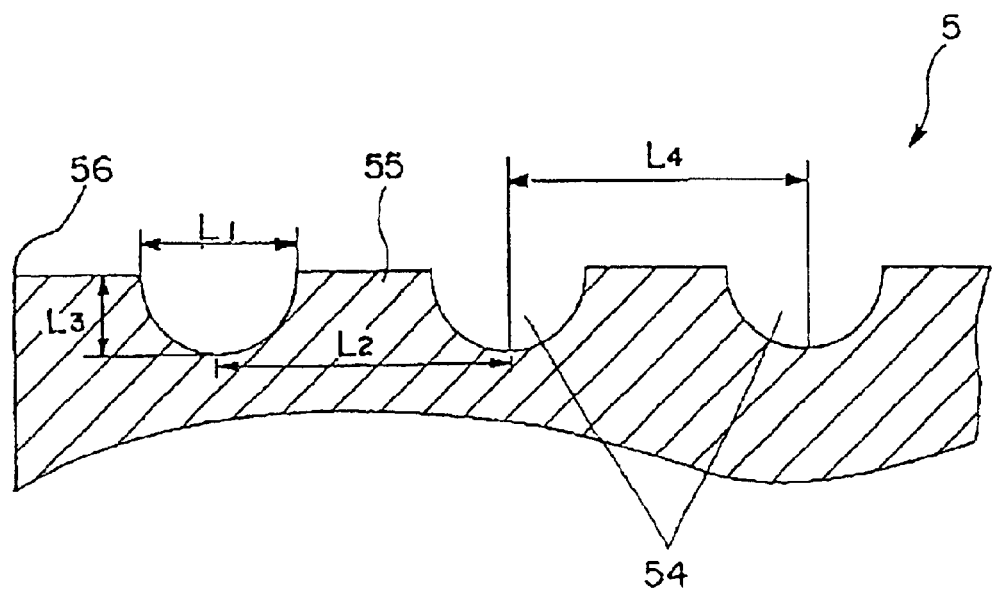
FIG. 15 is a sectional view which schematically shows the structure of a portion in the vicinity of the circumferential surface of the cooling roll shown in FIG. 14.

In this regard, FIG. 14 is a front view which schematically shows the cooling roll used in the magnetic material manufacturing method of the fourth embodiment of the present invention, and FIG. 15 is an enlarged sectional view of the cooling roll shown in FIG. 14.

As shown in FIG. 14, in this embodiment, the cooling roll 5 is formed with a plurality of V-shaped grooves each having a peak at the center of the width of the circumferential surface 53 of the cooling roll 5 along the axial direction thereof and two extending grooves extending to the edges 56 of the circumferential surface 53.

In this embodiment, by forming the grooves 54 having the above shape, the portions remaining in the circumferential surface 53 other than the grooves 54 and 54 constitute the ridges 55 comprised of a plurality of V-shape ridges.

When the cooling roll 5 having these grooves 54 are used, it is possible to expel the gas entered between the circumferential surface 53 and the puddle 7 more effectively by appropriately arranging such grooves with respect to the rotational direction of the cooling roll 5. Consequently, division for dimples is more effectively achieved, so that the area of each dimple and the total area of the dimples can be made small further.

Further, when the cooling roll 5 having these grooves 54 are used, the melt spun ribbon 8 receives laterally exerted force from the grooves 54 located at one side thereof as well as laterally exerted force from the grooves 54 located at the other side thereof, and these forces are balanced with each other (see FIG. 14). As a result, the melt spun ribbon 8 is positioned at the center of the cooling roll 5 in the axial direction thereof so that the advancing direction of the melt spun ribbon 8 becomes stable.

Although the dimple correcting means of the present invention was described above with reference to the first to fourth embodiments, the structure of the dimple correcting means such as its shape or form is not limited to those of the embodiments.

For example, although in the above embodiments the ridges acting as the dimple correcting means are constructed from the remaining shape of the circumferential surface that can be obtained as a result of the formation of the grooves, the ridges may be formed by using other methods. For example, the ridges may be formed by providing other members formed of the same material as the surface layer onto the circumferential surface of the cooling roll.

Further, it is to be understood that the shape or form of the dimple correcting means is not limited to the ridges mentioned above, and various shapes or forms can be used if they can exhibit the function for correcting dimples to formed on the roll contact surface of the melt spun ribbon.

Figure 16:
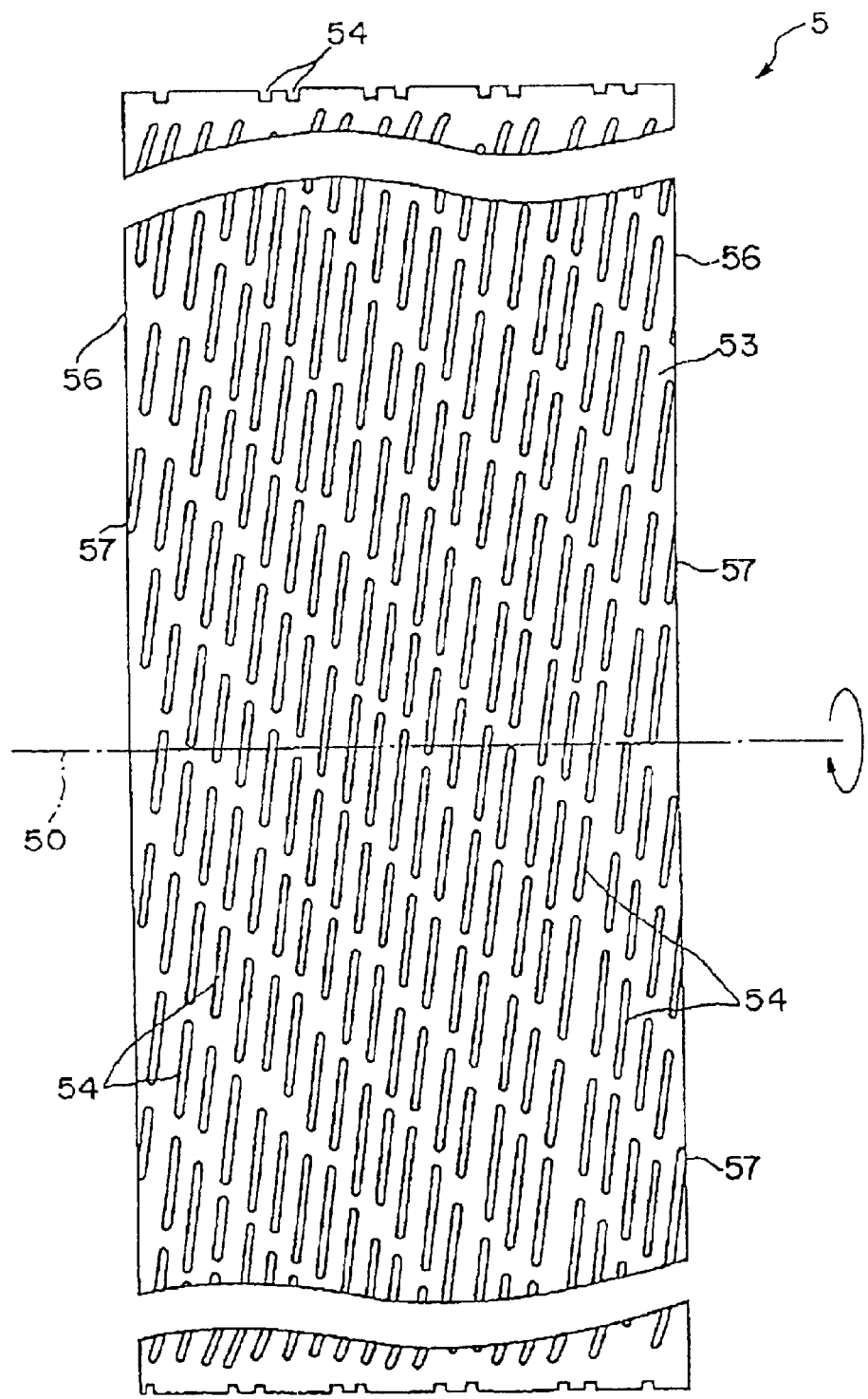
FIG. 16 is a front view which schematically shows other embodiment of the cooling roll which can be used in the manufacturing method of the present invention.

For example, as shown in FIG. 16, the dimple correcting means of the present invention can be formed from a number of separate short slanting grooves 54. Further, the cross sectional shape of each groove 54 may be formed into one shown in FIG. 17 or FIG. 18.

Figure 17:
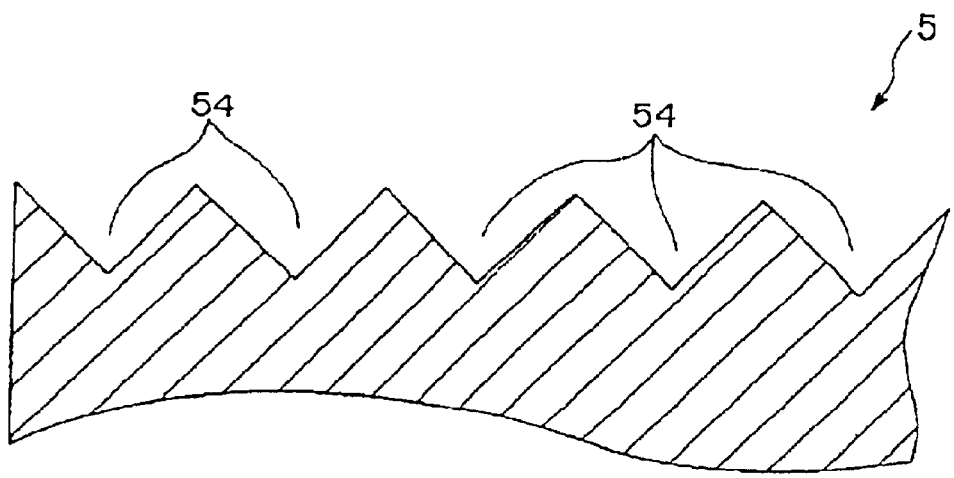
FIG. 17 is a sectional view which schematically shows one example of the structure of the circumferential surface of the cooling roll which can be used in the manufacturing method of the present invention.
Figure 18:
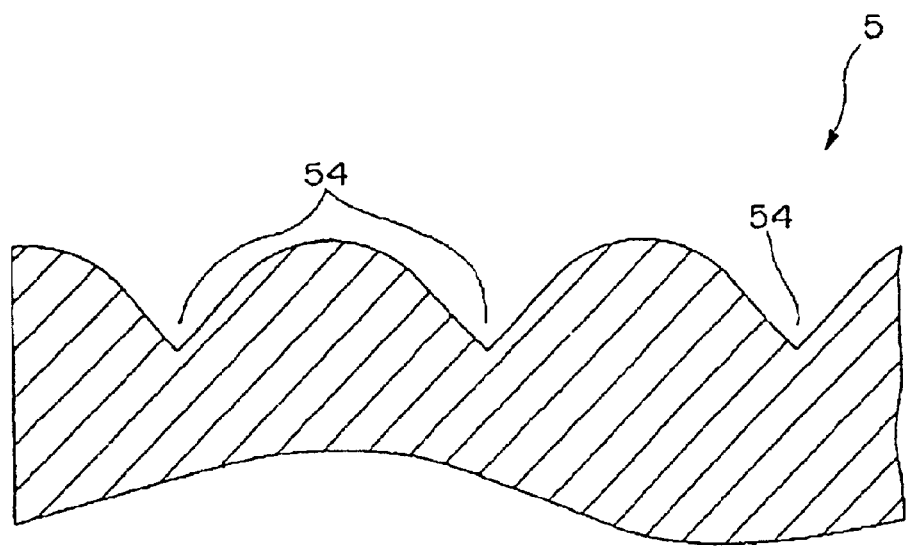
FIG. 18 is a sectional view which schematically shows another example of the structure of the circumferential surface of the cooling roll which can be used in the manufacturing method of the present invention.
Figure 19:
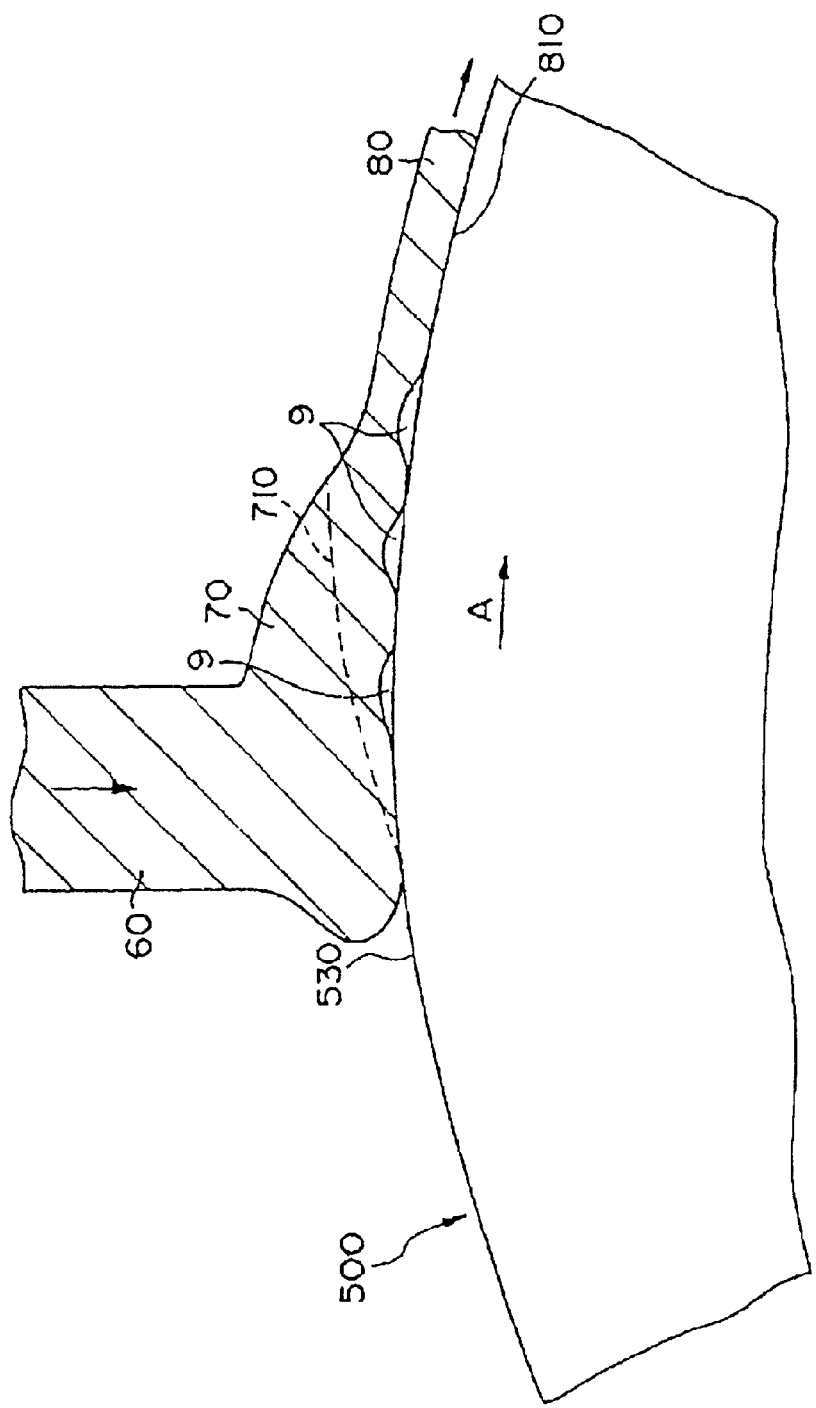
FIG. 19 is a sectional side view which shows the situation caused at or around a colliding section of a molten alloy with a cooling roll in the conventional apparatus (melt spinning apparatus) which manufactures a ribbon-shaped magnetic material using a single roll method.

According to the cooling rolls 5 shown in FIGS. 16 to 18, it is also possible to obtain the same results as those of the first to fourth embodiments.

EXAMPLES

Hereinafter, actual examples of the present invention will be described.

Example 1

A cooling roll A having the dimple correcting means shown in FIGS. 1 to 3 was manufactured, and then a melt spinning apparatus equipped with the cooling roll A shown in FIG. 1 was prepared.

The cooling roll A was manufactured as follows.

First, a roll base (having diameter of 200 mm and width of 30 mm) made of a copper (having heat conductive of 395 $W \cdot m^{-1} \cdot K^{-1}$ at t a temperature of 20° C. and coefficient of thermal expansion of $16.5 \times 10^{-6} K^{-1}$ at a temperature of 20° C.) was prepared, and then it was ground so as to have a mirror finishing outer circumferential surface with a surface roughness of Ra 0.07 $\mu$m.

Then, a plurality of grooves 54 which extend in parallel with the rotational direction of the roll base were formed by cutting.

As a result of the formation of the grooves, the portions remaining between the adjacent grooves 54 were used as ridges.

Next, a surface layer of ZrC (a kind of ceramics) (having heat conductivity of 20.6 $W \cdot m^{-1} K^{-1}$ at t a temperature of 20° C. and coefficient of thermal expansion of $7.0 \times 10^{-6} K^{-1}$ at a temperature of 20° C.) was formed onto the outer circumferential surface of the roll base by means of ion plating to obtain the cooling roll A shown in FIGS. 1 to 3.

By using the melt spinning apparatus 1 having thus obtained cooling roll A, melt spun ribbons made of an alloy composition represented by the formula of $(Nd_{0.7}Pr_{0.3})_{10.5}Fe_{bal.}B_6$ were manufactured in accordance with the following method.

First, an amount (basic weight) of each of the materials Nd, Pr, Fe and B was measured, and then a mother alloy ingot was manufactured by casting these materials.

Next, the mother alloy ingot was put into a crystal tube having a nozzle (circular orifice) 3 at the bottom thereof of the melt spinning apparatus 1. Thereafter, a chamber in which the melt spinning apparatus 1 is installed was vacuumed, and then an inert gas (Helium gas) was introduced to create a desired atmosphere of predetermined temperature and pressure.

Next, the mother alloy ingot in the crystal tube was melt by heating it by means of high frequency inductive heating. Then, under the conditions that the peripheral velocity of the cooling roll A was set to be 28 m/sec, the injection pressure (that is, the differential pressure between the ambient pressure and the summed pressure of the internal pressure of the crystal tube and the pressure applied to the surface of the liquid in the tube which is in proportion to the liquid level) of the molten alloy was set to be 40 kPa, and the pressure of the ambient gas was set to be 60 kPa, the molten alloy was injected toward the apex of the cooling roll A from just above the rotational axis of the cooling roll A, to manufacture a melt spun ribbon 8 (sample No. 1a) continuously.

Figure 6:
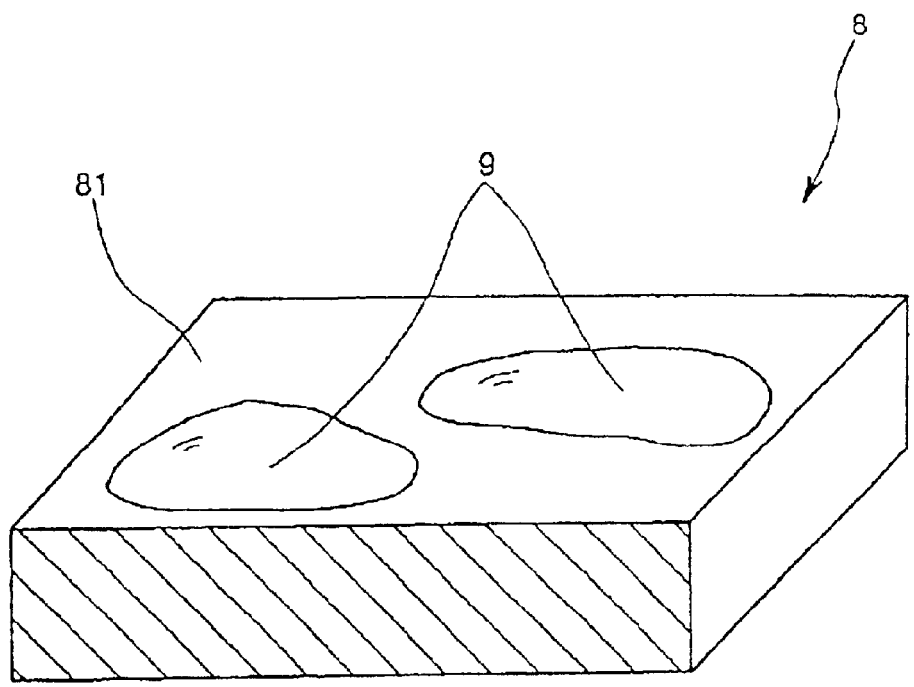
FIG. 6 is a perspective view which schematically shows the surface condition of the ribbon-shaped magnetic material manufactured by the conventional melt spinning apparatus.

In addition to the above, another six types of cooling rolls (cooling rolls B, C, D, E, F and G) each having the same configuration as that of the cooling roll A excepting that the shape and form of the grooves were formed into those shown in FIGS. 6 and 7 were manufactured. Here, it should be noted that these cooling rolls B to G were manufactured so that the average width of each groove, the average width of each ridge, the average depth of each groove (the average height of each ridge), and the average pitch of the adjacent grooves (ridges) were different from with each other in each of the cooling rolls. Further, in each of the cooling rolls, three sets of grooves were formed using a lathe having three cutting tools arranged so as to have the same interval so that the adjacent grooves have the same pitch in all the portions in the circumferential surfaces thereof Furthermore, in each of the cooling rolls, the angle θ defined between the longitudinal direction of each groove and the rotational direction the cooling roll was set to be 5°. Then, by replacing the cooling roll A of the melt spinning apparatus with each of these cooling rolls B to G sequentially, melt spun ribbons (sample Nos. 1b, 1c, 1d, 1e, 1f and 1g) were manufactured under the same conditions.

Further, a cooling roll H was also manufactured in the same manner as the cooling roll B excepting that the shape and form of the grooves and ridges were formed into those shown in FIGS. 12 and 13. Then, under the same conditions, a melt spun ribbon (sample No. 1h) was manufactured by replacing the cooling roll of the melt spinning apparatus with this cooling roll H. In this cooling roll H, the angles $\theta_1$ and $\theta_2$ defined between the longitudinal direction of each groove and the rotational direction the cooling roll were set to be 15°, respectively.

Furthermore, a cooling roll I was also manufactured in the same manner as the cooling roll A excepting that the shape and form of the grooves were formed into those shown in FIGS. 14 and 15. Then, under the same conditions, a melt spun ribbon (sample No. 1i) was manufactured by replacing the cooling roll of the melt spinning apparatus with this cooling roll I. In this cooling roll I, the angles $\theta_1$ and $\theta_2$ defined between the longitudinal direction of each groove and the rotational direction the cooling roll were set to be 20°, respectively.

Moreover, a cooling roll J was also manufactured in the same manner as the cooling roll A excepting that no grooves were formed after the outer circumferential surface was formed into a mirror finishing surface by grinding. In this cooling roll such a surface was used as a surface layer as it is. Then, under the same conditions, a melt spun ribbon (sample No. 1j) was manufactured by replacing the cooling roll of the melt spinning apparatus with this cooling roll J.

In each of these cooling rolls A to J, the thickness of the surface layer was 7 $\mu$m. Further, in each of the cooing rolls, no machine work was carried out onto the surface layer after the formation of the surface layers.

In each of the cooling rolls A to J, the width of each groove $L_1$ (average value), the width of each ridge $L_2$ (average value), the depth of each groove (the height of each ridge) $L_3$ (average value), the pitch $L_4$ (average value) of the adjacent grooves (ridges), and the ratio of the projected area of the grooves with respect to the projected area of the circumferential surface of the cooling roll are shown in the attached TABLE 1.

Then, for each of the ten melt spun ribbons (samples Nos. $1a$ to $1j$) which were respectively manufactured using each of the cooling rolls (A to J), the surface condition thereof was observed by a scanning electronic micrometer (SEM). As a result, it was confirmed that in each of the melt spun ribbons of the samples Nos. $1a$ to $1i$ (present invention), the surface shape or form (groove or ridges) of the cooling roll was transferred to the roll contact surface of the melt spun ribbon so that corresponding ridges or grooves are formed therein and dimples are produced with a state that they are divided by thus formed ridges or grooves (in particular, the grooves). In contrast, in the melt spun ribbon of the sample No. $1j$ (comparative example), it was confirmed that many huge dimples were produced.

Next, the following evaluations (1) and (2) were made for each of the melt spun ribbons of the sample Nos. $1a$ to $1j$.

(1) Magnetic Properties of the Respective Melt Spun Ribbons

A strip of the melt spun ribbon having the length of 5 cm was cut out from each of the melt spun ribbons, and then five samples each having the length of about 7 mm were obtained from each strip. Thereafter, for each of the samples, the average thickness t, the ratio of the projected area of the huge dimples (having an area equal to or greater than 2000 $\mu m^2$) produced on the roll contact surface thereof, the ratio of the projected area (total area) of all the dimples produced on the roll contact surface thereof, and the magnetic properties thereof were measured.

The thickness was measured using a micrometer at 20 sampling points in each of the samples, and the average of the measured values was used as the average thickness t. The ratio of the projected area of the huge dimples (having an area equal to or greater than 2000 $\mu m^2$) produced on the roll contact surface and the ratio of the projected area (total area) of all the dimples produced on the roll contact surface were obtained from the observation results by the scanning electronic microscope (SEM). With regard to the magnetic properties, the remanent magnetic flux density Br(T), the coercive force $H_{cj}$ (kA/m) and the maximum energy product $(BH)_{max}$ (kJ/m³) were measured using a vibrating sample magnetometer (VSM). In the measurement, the magnetic field was applied along the major axis of the respective melt spun ribbons. However, no demagnetization correction was performed.

(2) Magnetic Properties of Bonded Magnets

Each of the melt spun ribbons was subjected to a heat treatment in the argon gas atmosphere at a temperature of 675° C. for 300 sec.

Each of the melt spun ribbons to which the heat treatment was made was then milled to obtain magnetic powder of the mean particle size of 75 $\mu$m.

To analyze the phase structure of the obtained magnetic powders, the respective magnetic powders were subjected to an X-ray diffraction test using Cu—Kα line at the diffraction angle (2θ) of 20°–60°. As a result, in each of the magnetic powders, the obtained diffraction pattern shows only the presence of diffracted peaks of a hard magnetic phase, $R_2TM_{14}B$ phase.

In addition, in each of the magnetic powders, the phase structure was observed using a transmission electron microscope (TEM). With this result, it was confirmed that each magnetic powder was mainly constituted from a hard magnetic phase. $R_2TM_{14}B$ phase. Further, in each of the magnetic powders, the volume ratio of the $R_2TM_{14}B$ phase with respect to the whole structure (including amorphous structure) which was obtained from the observation results by the transmission electron microscope (TEM) (the observation was carried out for different ten points) was equal to or greater than 85%. Moreover, in each of the magnetic powders, an average crystal grain size of the $R_2TM_{14}B$ phase was also measured.

Next, each of the magnetic powders was mixed with an epoxy resin to obtain compositions for bonded magnets (compounds). In this case, each compound had the same mixing ratio (parts by weight) of the magnetic powder and the epoxy resin. Namely, in each sample, about 97.5 wt % of magnetic powder was contained.

Thereafter, each of the thus obtained compounds was milled or crushed to be granular. Then, the granular substance (particle) was weighed and filled into a die of a press machine and then it was subjected to a compaction molding (in the absence of a magnetic field) at a temperature of 120° C. and under the pressure of 600 MPa, to obtain a mold body. Then, the mold body was removed from the die, and then it was hardened by heating at a temperature of 175° C. to obtain a bonded magnet of a columnar shape having a diameter of 10 mm and a height of 8 mm.

Next, after pulse magnetization was performed for the respective bonded magnets under the magnetic field strength of 3.2 MA/m, magnetic properties (remanent magnetic flux density Br, coercive force $H_{CJ}$, and maximum magnetic energy product $(BH)_{max}$) were measured using a DC recording fluxmeter (manufactured and sold by Toei Industry Co. Ltd with the product code of TRF-5BH) under the maximum applied magnetic field of 2.0 MA/m. The temperature at the measurement was 23° C. (that is, room temperature).

The results of the measurements were shown in the attached TABLES 2 to 4.

As seen from TABLES 2 and 3, in each of the melt spun ribbons of the samples Nos. $1a$ to $1i$, the area occupied by the huge dimples was in the small range of 0.1 to 4.1%, and the area (total area) occupied by all the dimples was also small. Further, these melt spun ribbons had less dispersion in their magnetic properties, and they had generally excellent magnetic properties. This is supposed to result from the following reasons.

Namely, the cooling rolls A to I have the dimple correcting means on their circumferential surfaces. Therefore, in the manufacturing processes using these cooling rolls, formation of huge dimples is prevented or suppressed, so that the area of each dimple is made small and the therefore ratio of the area (total area) occupied by all the dimples also becomes small. Consequently, the difference in the cooling rates at the various portions of the puddle can be also made small, so that each of the obtained melt spun ribbons has small dispersion in its crystal grain sizes and its magnetic properties.

On the other hand, in the melt spun ribbon of sample No. $1j$ (Comparative Example), the ratio occupied by the huge dimples is in the relatively large range of 16.2 to 27.3% and the ratio of the area (total area) occupied by all the dimples is also larger as compared with the melt spun ribbons of the present invention. Further, there is large dispersion in its magnetic properties in spite of the fact that it has been cut out from the same melt spun ribbon. This is supposed to result from the following reasons.

In this sample $1j$, the gas which has entered between the puddle and the circumferential surface remains as it is to form huge dimples on the roll contact surface of the melt spun ribbon. Therefore, while a portion of the roll contact surface which is in contact with the circumferential surface has a relatively high cooling rate, a portion of the roll contact surface where such dimples are formed (in particular, a portion around the center of each huge dimple) has a lower cooling rate so that the crystal grain size at that portion becomes coarse. It is believed that this causes the large dispersion in the magnetic properties of the obtained melt spun ribbon.

Further, as apparent from TABLE 4, the bonded magnets formed from the melt spun ribbons of sample Nos. 1a to 1i (this invention) have excellent magnetic properties, while the bonded magnet formed from the sample No. 1j (comparative example) has merely poor magnetic properties.

This is supposed to result from the following reasons. Namely, the melt spun ribbons of the sample Nos. 1a to 1i (this invention) have excellent magnetic properties and less dispersion in their magnetic properties, so that it is believed that the bonded magnets formed from these melt spun ribbons can have excellent magnetic properties. On the other hand, the melt spun ribbon of the sample No. 1j has the large dispersion in its magnetic properties, so that it is believed that the bonded magnet formed from the melt spun ribbon has poor magnetic properties as a whole.

Example 2

Ten types of melt spun ribbons (sample Nos. 2a, 2b, 2c, 2d, 2e, 2f, 2g, 2h, 2i and 2j) were manufactured using the cooling rolls A to J in the same manner as Example 1 described above excepting that the alloy composition of each melt spun ribbon was $Nd_{11.5}Fe_{bal.}B_{4.6}$.

Then, for each of the ten melt spun ribbons (samples Nos. 2a to 2j) which were respectively manufactured using each of the cooling rolls (A to J), the surface condition thereof was observed by a scanning electronic micrometer (SEM). As a result, it was confirmed that in each of the melt spun ribbons of the samples Nos. 2a to 2i (present invention), the surface shape or form (groove or ridges) of the cooling roll was transferred to the roll contact surface of the melt spun ribbon so that corresponding ridges or grooves are formed therein and dimples are produced with a state that they are divided by thus formed ridges or grooves (in particular, the grooves). In contrast, in the melt spun ribbon of the sample No. 2j (comparative example), it was confirmed that many huge dimples were produced.

For each of the samples Nos. 2a to 2j, the magnetic properties of the melt spun ribbon was measured in the same manner as Example 1.

Then, each of the melt spun ribbons was subjected to a heat treatment in an argon gas atmosphere at a temperature of 675° C. for 300 sec.

Then, each of the melt spun ribbons which were subjected to the heat treatment was milled to obtain magnetic powder having a mean particle size of 75 μm.

To analyze the phase structure of the obtained magnetic powders, the respective magnetic powder was subjected to an X-ray diffraction test using Cu—Kα line at the diffraction angle (2θ) of 20°–60°. As a result, in each of the magnetic powders, the obtained diffraction pattern shows only the presence of a diffracted peak of a hard magnetic phase, $R_2TM_{14}B$ phase.

In addition, for each of the magnetic powders, the phase structure was observed using the transmission electron microscope (TEM). With this result, it was confirmed that each magnetic powder was mainly constituted from a hard magnetic phase, $R_2TM_{14}B$ phase. Further, in each of the magnetic powders, the volume ratio of the $R_2TM_{14}B$ phase with respect to the whole structure (including amorphous structure) which was obtained from the observation results by the transmission electron microscope (TEM) (the observation was carried out for different ten points) was equal to or greater than 95%. Moreover, in each of the magnetic powders, an average grain size of the $R_2TM_{14}B$ phase was also measured.

Next, using each of the magnetic powders, bonded magnets were manufactured in the same manner as Example 1, and then magnetic properties of the respective bonded magnets were measured.

The results of the measurements were shown in the attached TABLES 5 to 7.

As seen from TABLES 5 and 6, in the melt spun ribbons of the samples Nos. 2a to 2i, the area occupied by the huge dimples was in the small range of 0.1 to 4.3%, and the area (total area) occupied by all the dimples was also small. Further, these melt spun ribbons had less dispersion in their magnetic properties, and they had generally excellent magnetic properties. This is supposed to result from the following reasons.

Namely, the cooling rolls A to I have the dimple correcting means on their circumferential surfaces. Therefore, in the manufacturing processes using these cooling rolls, formation of huge dimples is prevented or suppressed, so that the area of each dimple is made small and therefore the ratio of the area (total area) occupied by all the dimples also becomes small. Consequently, the difference in the cooling rates at the various portions of the puddle can be also made small, so that each of the obtained melt spun ribbons has small dispersion in its crystal grain sizes and its magnetic properties.

On the other hand, in the melt spun ribbon of sample No. 2j (Comparative Example), the ratio occupied by the huge dimples is in the relatively large range of 16.5 to 27.8% and the ratio of the area (total area) occupied by all the dimples is also larger as compared with the melt spun ribbons of the present invention. Further, there is large dispersion in its magnetic properties in spite of the fact that it has been cut out from the same melt spun ribbon. This is supposed to result from the following reasons.

In this sample 2j, the gas which has entered between the puddle and the circumferential surface remains as it is to form huge dimples on the roll contact surface of the melt spun ribbon. Therefore, while a portion of the roll contact surface which is in contact with the circumferential surface has a relatively high cooling rate, a portion of the roll contact surface where such dimples are formed (in particular, a portion around the center of each huge dimple) has a lower cooling rate so that the crystal grain size at that portion becomes coarse. It is believed that this causes the large dispersion in the magnetic properties of the obtained melt spun ribbon.

Further, as apparent from TABLE 7, the bonded magnets formed from the melt spun ribbons of sample Nos. 2a to 2i (this invention) have excellent magnetic properties, while the bonded magnet formed from the sample No. 2j (comparative example) has merely poor magnetic properties.

This is supposed to result from the following reasons. Namely, the melt spun ribbons of the sample Nos. 2a to 2i (this invention) have excellent magnetic properties and less dispersion in their magnetic properties, so that it is believed that the bonded magnets formed from these melt spun ribbons can have excellent magnetic properties. On the other hand, the melt spun ribbon of the sample No. 2j has the large dispersion in its magnetic properties, so that it is believed that the bonded magnet formed from the melt spun ribbon has poor magnetic properties as a whole.

Example 3

Ten types of melt spun ribbons (sample Nos. 3a, 3b, 3c, 3d, 3e, 3f, 3g, 3h, 3i and 3j) were manufactured using the cooling rolls A to J in the same manner as Example 1 described above excepting that the alloy composition of each melt spun ribbon was $Nd_{14.2}(Fe_{0.85}Co_{0.15})_{bal.}\cdot B_{6.8}$.

Then, for each of the ten melt spun ribbons (samples Nos. 3a to 3j) which were respectively manufactured using each of the cooling rolls (A to J), the surface condition thereof was observed by a scanning electronic micrometer (SEM). As a result, it was confirmed that in each of the melt spun ribbons of the samples Nos. 3a to 3i (present invention), the surface shape or form (groove or ridges) of the cooling roll was transferred to the roll contact surface of the melt spun ribbon so that corresponding ridges or grooves are formed therein and dimples are produced with a state that they are divided by thus formed ridges or grooves (in particular, the grooves). In contrast, in the melt spun ribbon of the sample No. 3j (comparative example) it was confirmed that many huge dimples were produced.

For each of the samples Nos. 3a to 3j, the magnetic properties of the melt spun ribbon was measured in the same manner as Example 1.

Then, each of the melt spun ribbons was subjected to a heat treatment in an argon gas atmosphere at a temperature of 675° C. for 300 sec.

Then, each of the melt spun ribbons which were subjected to the heat treatment was milled to obtain magnetic powder having a mean particle size of 75 μm.

To analyze the phase structure of the obtained magnetic powders, the respective magnetic powder was subjected to an X-ray diffraction test using Cu—Kα line at the diffraction angle (2θ) of 20°–60°. As a result, in each of the magnetic powders, the obtained diffraction pattern shows only the presence of a diffracted peak of a hard magnetic phase, $R_2TM_{14}B$ phase.

In addition, for each of the magnetic powders, the phase structure was observed using the transmission electron microscope (TEM). With this result, it was confirmed that each magnetic powder was mainly constituted from a hard magnetic phase, $R_2TM_{14}B$ phase. Further, in each of the magnetic powders, the volume ratio of the $R_2TM_{14}B$ phase with respect to the whole structure (including amorphous structure) which was obtained from the observation results by the transmission electron microscope (TEM) (the observation was carried out for different ten points) was equal to or greater than 90%. Moreover, in each of the magnetic powders, an average grain size of the $R_2TM_{14}B$ phase was also measured.

Next, using each of the magnetic powders, bonded magnets were manufactured in the same manner as Example 1, and then magnetic properties of the respective bonded magnets were measured.

The results of the measurements were shown in the attached TABLES 8 to 10.

As seen from TABLES 8 and 9, in the melt spun ribbons of the samples Nos. 3a to 3i, the area occupied by the huge dimples was in the small range of 0.1 to 4.0%, and the area (total area) occupied by all the dimples was also small.

Further, these melt spun ribbons had less dispersion in their magnetic properties, and they had generally excellent magnetic properties. This is supposed to result from the following reasons.

Namely, the cooling rolls A to I have the dimple correcting means on their circumferential surfaces. Therefore, in the manufacturing processes using these cooling rolls, formation of huge dimples is prevented or suppressed, so that the area of each dimple is made small and therefore the ratio of the area (total area) occupied by all the dimples also becomes small. Consequently, the difference in the cooling rates at the various portions of the puddle can be also made small, so that each of the obtained melt spun ribbons has small dispersion in its crystal grain sizes and its magnetic properties.

On the other hand, in the melt spun ribbon of sample No. 3j (Comparative Example), the ratio occupied by the huge dimples was in the relatively large range of 15.6 to 28.1% and the ratio of the area (total area) occupied by all the dimples was also larger as compared with the melt spun ribbons of the present invention. Further, there was large dispersion in its magnetic properties in spite of the fact that it has been cut out from the same melt spun ribbon. This is supposed to result from the following reasons.

In this sample 3j, the gas which has entered between the puddle and the circumferential surface remains as it is to form huge dimples on the roll contact surface of the melt spun ribbon. Therefore, while a portion of the roll contact surface which is in contact with the circumferential surface has a relatively high cooling rate, a portion of the roll contact surface where such dimples are formed (in particular, a portion around the center of each huge dimple) has a lower cooling rate so that the crystal grain size at that portion becomes coarse. It is believed that this causes the large dispersion in the magnetic properties of the obtained melt spun ribbon Further, as apparent from TABLE 10, the bonded magnets formed from the melt spun ribbons of sample Nos. 3a to 3i (this invention) have excellent magnetic properties, while the bonded magnet formed from the sample No. 3j (comparative example) has merely poor magnetic properties.

This is supposed to result from the following reasons. Namely, the melt spun ribbons of the sample Nos. 3a to 3i (this invention) have excellent magnetic properties and less dispersion in their magnetic properties, so that it is believed that the bonded magnets formed from these melt spun ribbons can have excellent magnetic properties. On the other hand, the melt spun ribbon of the sample No. 3j has the large dispersion in its magnetic properties, so that it is believed that the bonded magnet formed from the melt spun ribbon has poor magnetic properties as a whole.

COMPARATIVE EXAMPLES

Ten types of melt spun ribbons (sample Nos. 4a, 4b, 4c, 4d, 4e, 4f, 4g, 4h, 4i and 4j) were manufactured using the cooling rolls A to J in the same manner as Example 1 described above excepting that the alloy composition of each melt spun ribbon was $Pr_3(Fe_{0.8}Co_{0.2})_{bal.}\cdot B_{3.5}$.

Then, for each of the ten melt spun ribbons (samples Nos. 4a to 4j) which were respectively manufactured using each of the cooling rolls (A to J), the surface condition thereof was observed by a scanning electronic micrometer (SEM). As a result, it was confirmed that in each of the melt spun ribbons of the samples Nos. 4ato 4i, the surface shape or form (groove or ridges) of the cooling roll was transferred to the roll contact surface of the melt spun ribbon so that corresponding ridges or grooves are formed therein and dimples are produced with a state that they are divided by thus formed ridges or grooves (in particular, the grooves). In contrast, in the melt spun ribbon of the sample No. 4j, It was confirmed that many huge dimples were produced.

For each of the samples Nos. 4a to 4j, the magnetic properties of the melt spun ribbon was measured in the same manner as Example 1.

Then, each of the melt spun ribbons was subjected to a heat treatment in an argon gas atmosphere at a temperature of 675° C. for 300 sec.

Then, each of the melt spun ribbons which were subjected to the heat treatment was milled to obtain magnetic powder having a mean particle size of 75 µm.

To analyze the phase structure of the obtained magnetic powders, the respective magnetic powder was subjected to an X-ray diffraction test using Cu—Kα line at the diffraction angle (2θ) of 20°–60°. As a result, in each of the magnetic powders, the obtained diffraction pattern shows the presence of various diffracted peaks such as a diffracted peak of a hard magnetic phase. $R_2TM_{14}B$ phase and a diffracted peak of a soft magnetic phase, α-(Fe, Co) phase and the like.

In addition, for each of the magnetic powders, the phase structure was observed using the transmission electron microscope (TEM) (the observation was carried out for different ten points). With this result, it was confirmed that in each of the magnetic powders the volume ratio of the $R_2TM_{14}B$ phase with respect to the whole structure (including amorphous structure) was equal to or less than 30%. Moreover, in each of the magnetic powders, an average grain size of the $R_2TM_{14}B$ phase was also measured.

Next, using each of the magnetic powders, bonded magnets were manufactured in the same manner as Example 1, and then magnetic properties of the respective bonded magnets were measured.

The results of the measurements were shown in the attached TABLES 11 to 13.

As seen from TABLES 11 and 12, all the melt spun ribbons of the samples Nos. 4a to 4j (Comparative Examples) had poor magnetic properties.

Further, in the melt spun ribbon of the sample No. 4j, the ratio of the area occupied by the huge dimples was in the relatively large range of 15.3 to 36.5% and therefore the ratio of the area (total area) occupied by the dimples was also larger as compared with other samples. Further, all the samples which had been cut out from the melt spun ribbon of the sample No. 4j had large dispersion in their magnetic properties in spite of the fact that they were cut out from the same melt spun ribbon. This is supposed to be resulted from the following reasons.

Namely, in the manufacturing process of these melt spun ribbons, gas which entered between the puddle and the circumferential surface remains as it is so that huge dimples are formed on the roll contact surface of each melt spun ribbon. Therefore, while the cooling rate at a portion which is in contact with the circumferential surface was relatively high, the cooling rate at a portion where such dimples were formed is lowered so that the crystal grain size at that portion becomes coarse. As a result, the obtained melt spun ribbons have larger dispersion in their magnetic properties.

Further, as seen from TABLE 13, all of the bonded magnets formed from the melt spun ribbons 4a to 4j had poor magnetic properties. Among these bonded magnets, the magnetic properties of the bonded magnet formed from the melt spun ribbon 4j were particularly poor.

This is supposed to result from the fact that the melt spun ribbon of the sample No. 4j had especially large dispersion in its magnetic properties over the various portions thereof, and therefore when a bonded magnet is formed from the melt spun ribbon, the magnetic properties thereof are further lowered.

As described above, according to the present invention, the following effects are realized.

Since the dimple correcting means is provided on the circumferential surface of the cooling roll, formation of huge dimples on the roll contact surface of the melt spun ribbon is prevented or suppressed. Further, even if dimples are produced on the roll surfaces, an area (size) of each dimple is relatively small, and therefore the total area occupied by the produced dimples also becomes small. Consequently, the difference in cooling rates at various portions of each puddle also becomes small, so that it is possible to stably obtain a melt spun ribbon having excellent magnetic properties.

In particular, by appropriately selecting the structural material and thickness of the surface layer and setting the shape and form of the grooves and ridges acting as the dimple correcting means, it is possible to control the area (size) of each dimple produced on the roll contact surface of the melt spun ribbon and the total area of the produced dimples properly, thereby enabling to obtain a magnetic material having excellent magnetic properties.

Further, since the magnetic powder is mainly constituted from a $R_2TM_{14}B$ phase, coercive force and heat resistance thereof can be enhanced.

Furthermore, since high magnetic flux density can be obtained, it is possible to manufacture bonded magnets having high magnetic properties even if they are isotropic bonded magnets. In particular, according to the present invention, more excellent magnetic performance can be obtained with a smaller size bonded magnet as compared with the conventional bonded magnet, it is possible to manufacture high performance smaller size motors.

Moreover, since a higher magnetic flux density can be secured as described above, in manufacturing bonded magnets sufficiently high magnetic properties can be obtained without pursuing any means for elevating the density of the bonded magnet. As a result, the dimensional accuracy, mechanical strength, corrosion resistance, heat resistance (heat stability) and the like can be further improved in addition to the improvement in the moldability, so that it is possible to readily manufacture bonded magnets with high reliability.

Moreover, since the magnetizability of the bonded magnet according to this invention is excellent, it is possible to magnetize a magnet with a lower magnetizing field. In particular, multipolar magnetization or the like can be accomplished easily and reliably, and further a high magnetic flux density can be also obtained.

Since a high density is not required to the bonded magnet, the present invention can be adapted to the manufacturing method such as the extrusion molding method or the injection molding method by which molding at high density is difficult as compared with the compaction molding method, and the effects described in the above can also be realized in the bonded magnet manufactured by these molding methods. Accordingly, various molding methods can be selectively used and thereby the degree of selection of shape for the bonded magnet can be expanded.

Finally, it is to be understood that the present invention is not limited to the embodiments and examples described above, and many changes or additions may be made without departing from the scope of the invention which is determined by the following claims.

TABLE 1

Conditions of Circumferential Surfaces of Cooling Rolls, Grooves and Ridges

|  | Average Width of Groove $L_1$ (μm) | Average Width of Ridge $L_2$ (μm) | Average Depth of Groove $L_3$ (μm) | Average Pitch $L_4$ (μm) | Ratio of Projected Area of Grooves (%) |
|---|---|---|---|---|---|
| Cooling Roll A | 22.5 | 2.5 | 3.5 | 25.0 | 90 |
| Cooling Roll B | 20.0 | 40.0 | 3.0 | 40.0 | 50 |
| Cooling Roll C | 10.0 | 12.0 | 1.5 | 12.0 | 83 |
| Cooling Roll D | 27.0 | 90.0 | 8.0 | 90.0 | 30 |
| Cooling Roll E | 30.0 | 50.0 | 2.0 | 50.0 | 60 |
| Cooling Roll F | 28.0 | 68.0 | 5.3 | 68.0 | 41 |

TABLE 1-continued

Conditions of Circumferential Surfaces of Cooling Rolls, Grooves and Ridges

|  | Average Width of Groove $L_1$ (μm) | Average Width of Ridge $L_2$ (μm) | Average Depth of Groove $L_3$ (μm) | Average Pitch $L_4$ (μm) | Ratio of Projected Area of Grooves (%) |
|---|---|---|---|---|---|
| Cooling Roll G | 5.0 | 7.5 | 1.0 | 7.5 | 67 |
| Cooling Roll H | 9.5 | 15.0 | 2.5 | 15.0 | 63 |
| Cooling Roll I | 20.0 | 30.0 | 1.5 | 30.0 | 67 |
| Cooling Roll J | — | — | — | — | — |

TABLE 2

Properties of Melt Spun Ribbons (Sample No. 1a to 1e)    (First Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| This Invention 1a | Cooling Roll A | 1 | 20 | 2.3 | 23 | 647 | 0.92 | 123 |
| | | 2 | 19 | 1.8 | 19 | 649 | 0.92 | 126 |
| | | 3 | 18 | 2.4 | 24 | 652 | 0.91 | 121 |
| | | 4 | 19 | 1.7 | 18 | 650 | 0.94 | 130 |
| | | 5 | 20 | 1.8 | 19 | 648 | 0.92 | 124 |
| This Invention 1b | Cooling Roll B | 1 | 21 | 2.5 | 25 | 638 | 0.90 | 119 |
| | | 2 | 22 | 2.3 | 23 | 640 | 0.91 | 120 |
| | | 3 | 21 | 2.1 | 20 | 635 | 0.92 | 124 |
| | | 4 | 21 | 2.6 | 26 | 625 | 0.89 | 115 |
| | | 5 | 20 | 2.4 | 25 | 629 | 0.90 | 118 |
| This Invention 1c | Cooling Roll C | 1 | 18 | 0.2 | 12 | 656 | 0.96 | 137 |
| | | 2 | 19 | 0.3 | 15 | 657 | 0.95 | 133 |
| | | 3 | 19 | 0.1 | 10 | 660 | 0.96 | 139 |
| | | 4 | 19 | 0.3 | 11 | 654 | 0.95 | 135 |
| | | 5 | 19 | 0.2 | 13 | 658 | 0.95 | 137 |
| This Invention 1d | Cooling Roll D | 1 | 23 | 4.1 | 36 | 612 | 0.86 | 108 |
| | | 2 | 19 | 3.0 | 31 | 623 | 0.88 | 114 |
| | | 3 | 24 | 3.9 | 35 | 616 | 0.86 | 110 |
| | | 4 | 20 | 3.8 | 35 | 619 | 0.87 | 111 |
| | | 5 | 22 | 3.5 | 33 | 620 | 0.87 | 112 |
| This Invention 1e | Cooling Roll E | 1 | 23 | 2.1 | 20 | 642 | 0.92 | 124 |
| | | 2 | 21 | 2.0 | 18 | 645 | 0.93 | 126 |
| | | 3 | 21 | 2.1 | 23 | 641 | 0.92 | 123 |
| | | 4 | 21 | 2.3 | 24 | 635 | 0.91 | 120 |
| | | 5 | 20 | 2.4 | 22 | 638 | 0.90 | 119 |

Metal Composition: $(Nd_{0.7}Pr_{0.3})_{10.5}Fe_{bal.}B_6$

TABLE 3

Properties of Melt Spun Ribbons (Sample No. 1f to 1j)    (First Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| This Invention 1f | Cooling Roll F | 1 | 21 | 1.9 | 18 | 645 | 0.93 | 129 |
| | | 2 | 23 | 2.3 | 22 | 637 | 0.91 | 120 |
| | | 3 | 22 | 1.8 | 20 | 643 | 0.93 | 127 |

TABLE 3-continued

Properties of Melt Spun Ribbons (Sample No. 1f to 1j)  (First Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| | | 4 | 22 | 2.0 | 23 | 640 | 0.93 | 125 |
| | | 5 | 21 | 2.2 | 21 | 638 | 0.92 | 122 |
| This Invention 1g | Cooling Roll G | 1 | 19 | 0.4 | 16 | 651 | 0.94 | 132 |
| | | 2 | 18 | 0.3 | 15 | 653 | 0.94 | 133 |
| | | 3 | 18 | 0.6 | 17 | 649 | 0.94 | 130 |
| | | 4 | 20 | 0.2 | 12 | 658 | 0.96 | 138 |
| | | 5 | 20 | 0.3 | 11 | 655 | 0.95 | 135 |
| This Invention 1h | Cooling Roll H | 1 | 21 | 1.1 | 17 | 644 | 0.93 | 127 |
| | | 2 | 21 | 0.9 | 17 | 648 | 0.94 | 131 |
| | | 3 | 20 | 1.3 | 19 | 642 | 0.93 | 125 |
| | | 4 | 20 | 1.1 | 18 | 646 | 0.93 | 129 |
| | | 5 | 21 | 1.4 | 21 | 639 | 0.92 | 124 |
| This Invention 1i | Cooling Roll I | 1 | 20 | 2.3 | 24 | 641 | 0.91 | 120 |
| | | 2 | 20 | 2.1 | 22 | 640 | 0.92 | 124 |
| | | 3 | 21 | 2.4 | 25 | 635 | 0.91 | 118 |
| | | 4 | 23 | 2.2 | 22 | 639 | 0.92 | 122 |
| | | 5 | 21 | 2.5 | 26 | 636 | 0.90 | 117 |
| Comp.Ex. 1j | Cooling Roll J | 1 | 30 | 18.6 | 45 | 382 | 0.69 | 59 |
| | | 2 | 17 | 23.1 | 55 | 303 | 0.81 | 74 |
| | | 3 | 32 | 20.5 | 48 | 376 | 0.71 | 62 |
| | | 4 | 23 | 27.3 | 60 | 340 | 0.72 | 65 |
| | | 5 | 19 | 16.2 | 50 | 328 | 0.75 | 68 |

Metal Composition: $(Nd_{0.7}Pr_{0.3})_{10.5}Fe_{bal.}B_6$

TABLE 4

Average Crystal Grain Size of Hard Magnetic Phase and Magnetic Properties of Bonded Magnet (First Embodiment)

| Melt Spun Ribbon Sample No. | Average Crystal Grain Size (nm) | $H_{CJ}$ (kA/m) | Br (T) | $(BH)_{max}$ (kJ/m³) |
|---|---|---|---|---|
| This Invention 1a | 32 | 648 | 0.78 | 89 |
| This Invention 1b | 38 | 631 | 0.77 | 83 |
| This Invention 1c | 25 | 655 | 0.81 | 98 |
| This Invention 1d | 40 | 615 | 0.75 | 80 |
| This Invention 1e | 37 | 643 | 0.77 | 86 |
| This Invention 1f | 30 | 639 | 0.79 | 88 |
| This Invention 1g | 27 | 650 | 0.80 | 95 |
| This Invention 1h | 28 | 642 | 0.80 | 92 |
| This Invention 1i | 34 | 638 | 0.78 | 85 |
| Comp. Ex 1j | 65 | 345 | 0.62 | 41 |

Metal Composition: $(Nd_{0.7}Pr_{0.3})_{10.5}Fe_{bal.}B_6$

TABLE 5

Properties of Melt Spun Ribbons (Sample No. 2a to 2e)  (Second Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| This Invention 2a | Cooling Roll A | 1 | 19 | 1.9 | 19 | 852 | 0.89 | 127 |
| | | 2 | 21 | 2.3 | 24 | 845 | 0.87 | 121 |
| | | 3 | 21 | 2.1 | 20 | 848 | 0.88 | 125 |
| | | 4 | 20 | 2.0 | 21 | 851 | 0.88 | 127 |
| | | 5 | 19 | 2.5 | 26 | 843 | 0.87 | 122 |
| This Invention 2b | Cooling Roll B | 1 | 22 | 2.4 | 22 | 838 | 0.85 | 115 |
| | | 2 | 21 | 2.7 | 25 | 844 | 0.84 | 113 |
| | | 3 | 22 | 2.6 | 26 | 842 | 0.85 | 115 |
| | | 4 | 23 | 2.7 | 24 | 837 | 0.83 | 111 |
| | | 5 | 22 | 2.2 | 25 | 839 | 0.85 | 117 |
| This Invention 2c | Cooling Roll C | 1 | 20 | 0.2 | 11 | 854 | 0.91 | 133 |
| | | 2 | 20 | 0.4 | 16 | 853 | 0.90 | 130 |
| | | 3 | 19 | 0.2 | 12 | 860 | 0.91 | 136 |
| | | 4 | 20 | 0.1 | 9 | 858 | 0.91 | 134 |
| | | 5 | 20 | 0.3 | 14 | 852 | 0.90 | 131 |

TABLE 5-continued

Properties of Melt Spun Ribbons (Sample No. 2a to 2e)    (Second Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| This Invention 2d | Cooling Roll D | 1 | 21 | 3.2 | 31 | 820 | 0.83 | 110 |
|  |  | 2 | 23 | 4.3 | 37 | 813 | 0.81 | 104 |
|  |  | 3 | 24 | 3.9 | 36 | 822 | 0.82 | 106 |
|  |  | 4 | 20 | 3.6 | 33 | 818 | 0.83 | 108 |
|  |  | 5 | 25 | 4.2 | 35 | 817 | 0.82 | 107 |
| This Invention 2e | Cooling Roll E | 1 | 22 | 2.2 | 23 | 845 | 0.87 | 123 |
|  |  | 2 | 21 | 2.1 | 22 | 841 | 0.87 | 124 |
|  |  | 3 | 24 | 2.4 | 28 | 836 | 0.86 | 122 |
|  |  | 4 | 22 | 2.6 | 25 | 839 | 0.86 | 118 |
|  |  | 5 | 22 | 2.3 | 21 | 842 | 0.86 | 121 |

Metal Composition: $Nd_{11.5}Fe_{bal.}B_{4.6}$

TABLE 6

Properties of Melt Spun Ribbons (Sample No. 2f to 2j)    (Second Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| This Invention 2f | Cooling Roll F | 1 | 23 | 2.0 | 18 | 838 | 0.88 | 125 |
|  |  | 2 | 22 | 2.1 | 19 | 842 | 0.87 | 124 |
|  |  | 3 | 22 | 2.3 | 23 | 836 | 0.87 | 123 |
|  |  | 4 | 24 | 2.2 | 22 | 846 | 0.88 | 127 |
|  |  | 5 | 23 | 2.5 | 24 | 841 | 0.86 | 121 |
| This Invention 2g | Cooling Roll G | 1 | 21 | 0.7 | 14 | 850 | 0.89 | 129 |
|  |  | 2 | 21 | 0.5 | 16 | 853 | 0.90 | 132 |
|  |  | 3 | 20 | 0.4 | 13 | 847 | 0.91 | 133 |
|  |  | 4 | 19 | 0.3 | 11 | 856 | 0.91 | 135 |
|  |  | 5 | 19 | 0.5 | 12 | 853 | 0.90 | 130 |
| This Invention 2h | Cooling Roll H | 1 | 21 | 1.2 | 20 | 842 | 0.87 | 120 |
|  |  | 2 | 22 | 1.5 | 19 | 846 | 0.86 | 116 |
|  |  | 3 | 22 | 1.1 | 21 | 839 | 0.87 | 122 |
|  |  | 4 | 22 | 1.3 | 19 | 843 | 0.86 | 118 |
|  |  | 5 | 21 | 1.4 | 18 | 847 | 0.85 | 115 |
| This Invention 2i | Cooling Roll I | 1 | 22 | 2.3 | 25 | 835 | 0.86 | 117 |
|  |  | 2 | 21 | 2.7 | 28 | 831 | 0.85 | 115 |
|  |  | 3 | 21 | 2.2 | 24 | 840 | 0.86 | 120 |
|  |  | 4 | 22 | 2.6 | 27 | 835 | 0.84 | 113 |
|  |  | 5 | 24 | 2.4 | 24 | 832 | 0.85 | 116 |
| Comp.Ex. 2j | Cooling Roll J | 1 | 19 | 22.5 | 52 | 375 | 0.73 | 62 |
|  |  | 2 | 33 | 16.5 | 44 | 453 | 0.66 | 55 |
|  |  | 3 | 17 | 24.2 | 58 | 386 | 0.71 | 64 |
|  |  | 4 | 34 | 17.7 | 49 | 463 | 0.63 | 51 |
|  |  | 5 | 22 | 27.8 | 86 | 395 | 0.68 | 56 |

Metal Composition: $Nd_{11.5}Fe_{bal.}B_{4.6}$

TABLE 7

Average Crystal Grain Size of Hard Magnetic Phase and Magnetic Properties of Bonded Magnet (Second Embodiment)

| Melt Spun Ribbon Sample No. | Average Crystal Grain Size (nm) | $H_{CJ}$ (kA/m) | Br (T) | $(BH)_{max}$ (kJ/m³) |
|---|---|---|---|---|
| This Invention 2a | 29 | 847 | 0.75 | 91 |
| This Invention 2b | 37 | 838 | 0.73 | 83 |
| This Invention 2c | 26 | 851 | 0.77 | 95 |
| This Invention 2d | 42 | 819 | 0.71 | 80 |
| This Invention 2e | 32 | 840 | 0.75 | 89 |
| This Invention 2f | 30 | 839 | 0.75 | 90 |
| This Invention 2g | 28 | 852 | 0.76 | 93 |
| This Invention 2h | 34 | 843 | 0.75 | 87 |
| This Invention 2i | 36 | 830 | 0.74 | 85 |
| Comp. Ex 2j | 67 | 390 | 0.55 | 39 |

Metal Composition: $Nd_{11.5}Fe_{bal.}B_{4.6}$

TABLE 8

Properties of Melt Spun Ribbons (Sample No. 3a to 3e)  (Third Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m$^3$) |
|---|---|---|---|---|---|---|---|---|
| This Invention 3a | Cooling Roll A | 1 | 22 | 2.3 | 20 | 1087 | 0.84 | 122 |
| | | 2 | 22 | 1.6 | 18 | 1092 | 0.85 | 126 |
| | | 3 | 21 | 1.7 | 21 | 1090 | 0.85 | 125 |
| | | 4 | 20 | 2.4 | 22 | 1084 | 0.84 | 120 |
| | | 5 | 20 | 1.9 | 20 | 1089 | 0.84 | 123 |
| This Invention 3b | Cooling Roll B | 1 | 22 | 1.9 | 19 | 1068 | 0.83 | 118 |
| | | 2 | 23 | 2.4 | 22 | 1062 | 0.81 | 113 |
| | | 3 | 24 | 2.3 | 22 | 1065 | 0.80 | 111 |
| | | 4 | 23 | 2.2 | 21 | 1065 | 0.82 | 115 |
| | | 5 | 23 | 2.2 | 23 | 1061 | 0.81 | 114 |
| This Invention 3c | Cooling Roll C | 1 | 21 | 0.3 | 13 | 1100 | 0.85 | 126 |
| | | 2 | 20 | 0.1 | 8 | 1112 | 0.86 | 131 |
| | | 3 | 21 | 0.2 | 15 | 1103 | 0.85 | 126 |
| | | 4 | 22 | 0.2 | 10 | 1108 | 0.86 | 127 |
| | | 5 | 21 | 0.4 | 12 | 1095 | 0.85 | 125 |
| This Invention 3d | Cooling Roll D | 1 | 24 | 3.1 | 32 | 1057 | 0.79 | 110 |
| | | 2 | 25 | 4.0 | 38 | 1046 | 0.78 | 103 |
| | | 3 | 22 | 3.7 | 39 | 1048 | 0.78 | 105 |
| | | 4 | 26 | 3.6 | 36 | 1051 | 0.79 | 107 |
| | | 5 | 22 | 3.3 | 35 | 1053 | 0.79 | 108 |
| This Invention 3e | Cooling Roll E | 1 | 22 | 1.8 | 19 | 1079 | 0.84 | 124 |
| | | 2 | 25 | 2.0 | 22 | 1080 | 0.83 | 121 |
| | | 3 | 23 | 2.1 | 20 | 1076 | 0.82 | 118 |
| | | 4 | 24 | 2.2 | 23 | 1075 | 0.82 | 117 |
| | | 5 | 23 | 1.9 | 23 | 1078 | 0.83 | 122 |

Metal Composition: $Nd_{14.2}(Fe_{0.85}Co_{0.15})_{bal.}B_{6.8}$

TABLE 9

Properties of Melt Spun Ribbons (Sample No. 3f to 3j)  (Third Embodiment)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m$^3$) |
|---|---|---|---|---|---|---|---|---|
| This Invention 3f | Cooling Roll F | 1 | 23 | 2.2 | 25 | 1074 | 0.82 | 119 |
| | | 2 | 23 | 1.7 | 20 | 1076 | 0.84 | 126 |
| | | 3 | 25 | 1.8 | 18 | 1077 | 0.83 | 124 |
| | | 4 | 24 | 2.0 | 18 | 1075 | 0.83 | 121 |
| | | 5 | 24 | 1.9 | 21 | 1073 | 0.84 | 123 |
| This Invention 3g | Cooling Roll G | 1 | 22 | 0.5 | 12 | 1089 | 0.85 | 124 |
| | | 2 | 21 | 0.2 | 10 | 1096 | 0.86 | 127 |
| | | 3 | 20 | 0.3 | 11 | 1098 | 0.85 | 125 |
| | | 4 | 19 | 0.3 | 15 | 1091 | 0.83 | 121 |
| | | 5 | 21 | 0.4 | 13 | 1093 | 0.84 | 123 |
| This Invention 3h | Cooling Roll H | 1 | 23 | 0.8 | 13 | 1083 | 0.85 | 127 |
| | | 2 | 23 | 1.2 | 15 | 1081 | 0.83 | 123 |
| | | 3 | 21 | 1.4 | 16 | 1082 | 0.83 | 122 |
| | | 4 | 22 | 1.1 | 15 | 1080 | 0.85 | 126 |
| | | 5 | 22 | 1.0 | 17 | 1078 | 0.82 | 121 |
| This Invention 3i | Cooling Roll I | 1 | 22 | 2.0 | 21 | 1074 | 0.82 | 116 |
| | | 2 | 22 | 2.4 | 26 | 1070 | 0.82 | 120 |
| | | 3 | 23 | 2.2 | 23 | 1072 | 0.81 | 115 |
| | | 4 | 25 | 2.4 | 25 | 1069 | 0.82 | 119 |
| | | 5 | 23 | 2.3 | 24 | 1071 | 0.83 | 122 |
| Comp.Ex. 3j | Cooling Roll J | 1 | 35 | 15.6 | 43 | 560 | 0.61 | 53 |
| | | 2 | 19 | 24.5 | 56 | 509 | 0.64 | 65 |
| | | 3 | 38 | 17.8 | 49 | 575 | 0.60 | 51 |
| | | 4 | 22 | 19.7 | 52 | 511 | 0.67 | 67 |
| | | 5 | 18 | 28.1 | 61 | 537 | 0.62 | 59 |

Metal Composition: $Nd_{14.2}(Fe_{0.85}Co_{0.15})_{bal.}B_{6.8}$

TABLE 10

Average Crystal Grain Size of Hard Magnetic Phase and Magnetic Properties of Bonded Magnet (Third Embodiment)

| Melt Spun Ribbon Sample No. | Average Crystal Grain Size (nm) | $H_{CJ}$ (kA/m) | Br (T) | $(BH)_{max}$ (kJ/m³) |
|---|---|---|---|---|
| This Invention 3a | 28 | 1085 | 0.71 | 86 |
| This Invention 3b | 36 | 1060 | 0.70 | 80 |
| This Invention 3c | 24 | 1102 | 0.72 | 89 |
| This Invention 3d | 41 | 1050 | 0.66 | 74 |
| This Invention 3e | 32 | 1078 | 0.71 | 82 |
| This Invention 3f | 30 | 1072 | 0.71 | 84 |
| This Invention 3g | 25 | 1090 | 0.72 | 88 |
| This Invention 3h | 27 | 1081 | 0.71 | 86 |
| This Invention 3i | 34 | 1069 | 0.70 | 81 |
| Comp. Ex 3j | 62 | 545 | 0.53 | 45 |

Metal Composition: $Nd_{14.2}(Fe_{0.85}Co_{0.15})_{bal.}B_{6.6}$

TABLE 11

Properties of Melt Spun Ribbons (Sample No. 4a to 4e)   (Comp.Ex.)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| Comp.Ex. 4a | Cooling Roll A | 1 | 17 | 2.6 | 25 | 120 | 0.80 | 33 |
| | | 2 | 18 | 1.9 | 21 | 117 | 0.79 | 32 |
| | | 3 | 19 | 1.8 | 19 | 122 | 0.80 | 34 |
| | | 4 | 19 | 2.5 | 24 | 115 | 0.80 | 33 |
| | | 5 | 18 | 2.2 | 20 | 119 | 0.80 | 33 |
| Comp.Ex. 4b | Cooling Roll B | 1 | 20 | 2.3 | 22 | 112 | 0.77 | 28 |
| | | 2 | 21 | 2.8 | 28 | 111 | 0.76 | 26 |
| | | 3 | 19 | 2.4 | 25 | 108 | 0.76 | 25 |
| | | 4 | 20 | 2.7 | 26 | 107 | 0.76 | 24 |
| | | 5 | 21 | 2.6 | 27 | 113 | 0.77 | 26 |
| Comp.Ex. 4c | Cooling Roll C | 1 | 18 | 0.4 | 13 | 125 | 0.82 | 36 |
| | | 2 | 18 | 0.2 | 11 | 122 | 0.82 | 35 |
| | | 3 | 17 | 0.3 | 12 | 127 | 0.81 | 34 |
| | | 4 | 18 | 0.4 | 15 | 130 | 0.81 | 34 |
| | | 5 | 19 | 0.3 | 10 | 123 | 0.81 | 33 |
| Comp.Ex. 4d | Cooling Roll D | 1 | 23 | 4.2 | 38 | 103 | 0.71 | 19 |
| | | 2 | 19 | 3.9 | 35 | 105 | 0.72 | 21 |
| | | 3 | 21 | 3.8 | 35 | 108 | 0.72 | 22 |
| | | 4 | 22 | 4.4 | 37 | 109 | 0.70 | 18 |
| | | 5 | 18 | 3.5 | 32 | 104 | 0.71 | 19 |
| Comp.Ex. 4e | Cooling Roll E | 1 | 20 | 2.3 | 21 | 120 | 0.80 | 33 |
| | | 2 | 21 | 2.5 | 22 | 116 | 0.79 | 32 |
| | | 3 | 20 | 2.6 | 24 | 119 | 0.80 | 31 |
| | | 4 | 19 | 2.2 | 23 | 115 | 0.79 | 32 |
| | | 5 | 22 | 2.1 | 19 | 117 | 0.78 | 31 |

Metal Composition: $Pr_3(Fe_{0.8}Co_{0.2})_{bal.}B_{3.5}$

TABLE 12

Properties of Melt Spun Ribbons (Sample No. 4f to 4j)   (Comp.Ex.)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| Comp.Ex. 4f | Cooling Roll F | 1 | 21 | 2.1 | 23 | 114 | 0.78 | 31 |
| | | 2 | 21 | 2.0 | 22 | 118 | 0.79 | 33 |
| | | 3 | 20 | 2.4 | 28 | 116 | 0.79 | 33 |
| | | 4 | 23 | 2.2 | 21 | 112 | 0.78 | 30 |
| | | 5 | 20 | 2.6 | 28 | 115 | 0.79 | 32 |
| Comp.Ex. 4g | Cooling Roll G | 1 | 17 | 0.5 | 15 | 125 | 0.80 | 33 |
| | | 2 | 18 | 0.3 | 11 | 120 | 0.81 | 34 |
| | | 3 | 19 | 0.4 | 13 | 121 | 0.80 | 33 |
| | | 4 | 19 | 0.7 | 16 | 118 | 0.80 | 33 |
| | | 5 | 18 | 0.4 | 12 | 123 | 0.81 | 34 |
| Comp.Ex. 4h | Cooling Roll H | 1 | 20 | 1.6 | 18 | 120 | 0.80 | 34 |
| | | 2 | 20 | 1.4 | 15 | 116 | 0.79 | 32 |
| | | 3 | 19 | 1.7 | 21 | 118 | 0.80 | 33 |
| | | 4 | 19 | 1.4 | 16 | 114 | 0.79 | 31 |
| | | 5 | 20 | 1.2 | 12 | 117 | 0.79 | 33 |

TABLE 12-continued

Properties of Melt Spun Ribbons (Sample No. 4f to 4j) (Comp.Ex.)

| Sample No. | Cooling Roll Used for Manufacturing Melt Spun Ribbons | | Average Thickness (μm) | Ratio of Projected Area of Huge Dimples (%) | Ratio of Total Area of Dimples (%) | $H_{CJ}$ (kA/m) | Br (T) | $(BH)_{max}$ (kJ/m³) |
|---|---|---|---|---|---|---|---|---|
| Comp.Ex. 4i | Cooling Roll I | 1 | 22 | 2.6 | 26 | 115 | 0.77 | 30 |
| | | 2 | 20 | 2.4 | 24 | 117 | 0.78 | 32 |
| | | 3 | 19 | 2.7 | 27 | 114 | 0.77 | 31 |
| | | 4 | 18 | 2.5 | 26 | 113 | 0.77 | 30 |
| | | 5 | 20 | 2.2 | 23 | 116 | 0.77 | 29 |
| Comp.Ex. 4j | Cooling Roll J | 1 | 29 | 15.3 | 46 | 72 | 0.61 | 12 |
| | | 2 | 16 | 21.2 | 53 | 83 | 0.62 | 13 |
| | | 3 | 34 | 26.5 | 60 | 69 | 0.60 | 11 |
| | | 4 | 21 | 19.8 | 48 | 75 | 0.62 | 12 |
| | | 5 | 17 | 23.2 | 57 | 85 | 0.62 | 14 |

Metal Composition: $Pr_3(Fe_{0.8}Co_{0.2})_{bal.}B_{3.5}$

TABLE 13

Average Crystal Grain Size of Hard Magnetic Phase and Magnetic Properties of Bonded Magnet (Comp. Ex.)

| Melt Spun Ribbon Sample No. | Average Crystal Grain Size (nm) | $H_{CJ}$ (kA/m) | Br (T) | $(BH)_{max}$ (kJ/m³) |
|---|---|---|---|---|
| This Invention 4a | 40 | 118 | 0.67 | 22 |
| This Invention 4b | 47 | 110 | 0.65 | 18 |
| This Invention 4c | 35 | 125 | 0.68 | 25 |
| This Invention 4d | 52 | 106 | 0.61 | 15 |
| This Invention 4e | 43 | 118 | 0.67 | 21 |
| This Invention 4f | 42 | 113 | 0.67 | 22 |
| This Invention 4g | 36 | 120 | 0.68 | 24 |
| This Invention 4h | 38 | 117 | 0.67 | 23 |
| This Invention 4i | 46 | 115 | 0.66 | 20 |
| Comp. Ex 4j | 83 | 70 | 0.56 | 9 |

Metal Composition: $Pr_3(Fe_{0.8}Co_{0.2})_{bal.}B_{3.5}$

What is claimed is:

1. A magnetic material manufacturing method for manufacturing a ribbon-shaped magnetic material comprising:
   colliding a molten alloy to a circumferential surface of a cooling roll so as to cool and then solidify the molten alloy, wherein the ribbon-shaped magnetic material having an alloy composition represented by the formula of $R_x(Fe_{1-y}Co_y)_{100-x-z}B_z$ (where R is at least one rare earth element, x is 10–15 at %, y is 0–0.30 and z is 4–10 at %);
   dividing dimples that are produced on a roll contact surface of the ribbon-shaped magnetic material which is in contact with the circumferential surface of the cooling roll with dimple correcting means, the dimple correcting means defined by a plurality of redges that are formed by grooves formed in the circumferential surface of the cooling roll at an angle less than or equal to 30° relative to an edge of the cooling roll, wherein an average width of each groove is 0.5–90 μm for discontinuous, discreet, and spaced apart regions, wherein the ratio of the area of the grooves with respect to the area of the circumferential surface when they are projected on the same plane is in the range of 30–99.5%.

2. The manufacturing method as claimed in claim 1, wherein the cooling roll includes a roll base and an outer surface layer provided on an outer peripheral portion of the roll base, and the outer surface layer has said dimple correcting means.

3. The manufacturing method as claimed in claim 1, wherein the outer surface layer of the cooling roll is formed of a material having a heat conductivity lower than a heat conductivity of the structural material of the roll base at room temperature.

4. The manufacturing method as claimed in claim 2, wherein the outer surface layer of the cooling roll is formed of a ceramic.

5. The manufacturing method as claimed in claim 2, wherein the outer surface layer of the cooling roll is formed of a material having a heat conductivity equal to or less than 80 $Wm^{-1}K^{-1}$ at room temperature.

6. The manufacturing method as claimed in claim 2, wherein the outer surface layer of the cooling roll is formed of a material having a coefficient of thermal expansion in a range of 3.5–18[$\times 10^{-6}K^{-1}$] at room temperature.

7. The manufacturing method as claimed in claim 2, wherein an average thickness of the outer surface layer of the cooling roll is 0.5 to 50 μm.

8. The manufacturing method as claimed in claim 2, wherein the outer surface layer of the cooling roll is manufactured without experiencing a machining process.

9. The manufacturing method as claimed in claim 1, wherein the average width of the ridge is 0.5–90 μm.

10. The manufacturing method as claimed in claim 1, wherein the average height of the ridge or the average depth of the groove is 0.5–20 μm.

11. The manufacturing method as claimed in claim 1, wherein the ridge or groove is formed spirally with respect to the rotation axis of the cooling roll.

12. The manufacturing method as claimed in claim 1, wherein the at least one ridge or groove includes a plurality of ridges or grooves which are arranged in parallel with each other through an average pitch of 0.5–100 μm.

13. The manufacturing method as claimed in claim 1, wherein the ratio of the projected area of the ridge or groove with respect to the projected area of the circumferential surface is equal to or greater than 10%.

14. The manufacturing method as claimed in claim 1, wherein the method includes a step for milling the ribbon-shaped magnetic material.

15. The manufacturing method as claimed in claim 1, wherein a cross-section of the grooves is square-shaped.

16. The manufacturing method as claimed in claim 1, wherein a cross-section of the grooves is triangle-shaped.

17. The manufacturing method as claimed in claim 1, wherein a cross-section of the grooves is round-shaped.

18. A magnetic material manufacturing method for manufacturing a ribbon-shaped magnetic material comprising:

colliding a molten alloy to a circumferential surface of a cooling roll so as to cool and then solidify the molten alloy, wherein the ribbon-shaped magnetic material has an alloy composition represented by the formula of $R_x(Fe_{1-y}CO_y)_{100-x-z}B_z$ (where R is at least one rare earth element, x is 10–15 at %, y is 0–0.30 and z if 4–10 at %); and dividing dimples that are produced on a roll contact surface of the ribbon-shaped magnetic material which is in contact with the circumferential surface of the cooling roll with dimple correcting means, the dimple correcting means defined by a plurality of redges provided on a circumferential surface of the cooling roll for dividing dimples that are produced on a roll contact surface of the cooling roll;

wherein the plurality of ridges are provided by forming at least two spiral grooves of which a direction of each spiral groove is different so that the grooves intersect on the circumferential surface of the cooling roll, the grooves having an average width of 0.5–90 μm to prevent a molten alloy of the magnetic material from entering the groove; and a ratio of an area of the grooves with respect to an area of the circumferential surface when they are projected on the same plane is in the range of 30–99.5%.

19. The magnetic material manufacturing method of claim 18, wherein each spiral groove has angle relative to an edge of the cooling roll that is less than or equal to 30°; and the angle of each spiral groove is different.

20. The magnetic material manufacturing method of claim 18, wherein a cross-section of the grooves is square-shaped.

21. The magnetic material manufacturing method of claim 18, wherein a cross-section of the grooves is triangle-shaped.

22. The magnetic material manufacturing method of claim 18, wherein a cross-section of the grooves is round-shaped.

* * * * *

UNITED STATES PATENT AND TRADEMARK OFFICE
CERTIFICATE OF CORRECTION

PATENT NO. : 6,830,633 B2  Page 1 of 1
APPLICATION NO. : 09/871592
DATED : December 14, 2004
INVENTOR(S) : Akira Arai and Hiroshi Kato It is certified that error appears in the above-identified patent and that said Letters Patent is hereby corrected as shown below:

<u>Title page,</u>
Item [75], Inventors, "Shinosuwa-machi (JP)" should be -- Shimosuwa-machi (JP) --.

<u>Column 2,</u>
Line 29, "100-x-y" should be -- 100-x-z --.

<u>Column 4,</u>
Line 8, "provided" should be -- provide --.
Line 47, "Is" should be -- is --.
Line 58, "Other" should be -- Another --.

<u>Column 6,</u>
Line 35, "Is" should be -- is --.
Line 47, "Other" should be -- another --.

<u>Column 7,</u>
Line 47, "Is" should be -- is --.

<u>Column 8,</u>
Line 39, "It" should be -- it --.

Signed and Sealed this

Twentieth Day of June, 2006

JON W. DUDAS
*Director of the United States Patent and Trademark Office*